United States Patent
Hegmann et al.

(10) Patent No.: US 8,092,712 B2
(45) Date of Patent: Jan. 10, 2012

(54) BENT-CORE LC DECORATED GOLD NANOCLUSTERS

(75) Inventors: Torsten Hegmann, Winnipeg (CA); Vanessa M. Marx, Halifax (CA)

(73) Assignee: Ridout & Maybee LLP, Toronto, Ontario (CA)

( * ) Notice: Subject to any disclaimer, the term of this patent is extended or adjusted under 35 U.S.C. 154(b) by 0 days.

(21) Appl. No.: 12/739,616

(22) PCT Filed: Oct. 24, 2008

(86) PCT No.: PCT/CA2008/001884
§ 371 (c)(1),
(2), (4) Date: Oct. 25, 2010

(87) PCT Pub. No.: WO2009/052632
PCT Pub. Date: Apr. 30, 2009

(65) Prior Publication Data
US 2011/0062385 A1    Mar. 17, 2011

Related U.S. Application Data

(60) Provisional application No. 60/982,445, filed on Oct. 25, 2007.

(51) Int. Cl.
*C09K 19/20* (2006.01)
*C07C 321/00* (2006.01)
(52) U.S. Cl. .................... 252/299.65; 560/18
(58) Field of Classification Search ............. 252/299.65; 560/18, 76
See application file for complete search history.

(56) References Cited

FOREIGN PATENT DOCUMENTS
WO    WO-2009052632 A1    4/2009

OTHER PUBLICATIONS

Achten et al., "Asymmetric banana-shaped liquid crystals with two different terminal alkoxy chains", Liquid Crystals (2004), 31(8):1167-1174.
Achten et al., "Non-symmetric bent-core mesogens with one terminal vinyl group", Liquid Crystals (2005), 32(3):277-285.
Kirchhoff et al., "Low electric-field-induced switching in the B1 bent-core liquid crystal phase", Applied Physics Letters (2007), 90(16):161905-1-161905-3.
Schröder et al., "Field-induced switching of the layer chirality in SmCP phases of novel achiral bent-core liquid crystals and their unusual large increase in clearing temperature under electric field application", Chemphyschem. (2004), 5(1):99-103.
Shen et al., "Molecular Design of Nonchiral Bent-Core Liquid Crystals with Antiferroelectric Properties", J. Am. Chem. Soc. (2000), 122 (8):1593-1601.
Weissflog et al., "Ten isomeric five-ring bent-core mesogens: The influence of the direction of the carboxyl connecting groups on the mesophase behavior", J. Mater. Chem. (2005), 15:4328-4337.

*Primary Examiner* — Shean Wu
(74) *Attorney, Agent, or Firm* — Ivor R. Elrifi; Mintz, Levin, Cohn, Ferris, Glovsky and Popeo, P.C.

(57) ABSTRACT

Novel thiol-terminated bent-core liquid crystals (LCs) are used to decorate gold nanoparticles. Thioacetate or xanthate/xanthogenate functional groups are used to effect the attachment of the LCs to the gold nanoparticles. Such bent-core decorated nanoparticles may be dissolved in bent-core liquid crystal host media to provide polarizable systems which respond quickly to applied electric fields and exhibit other interesting and useful optical and electro-optic behaviour.

7 Claims, 25 Drawing Sheets

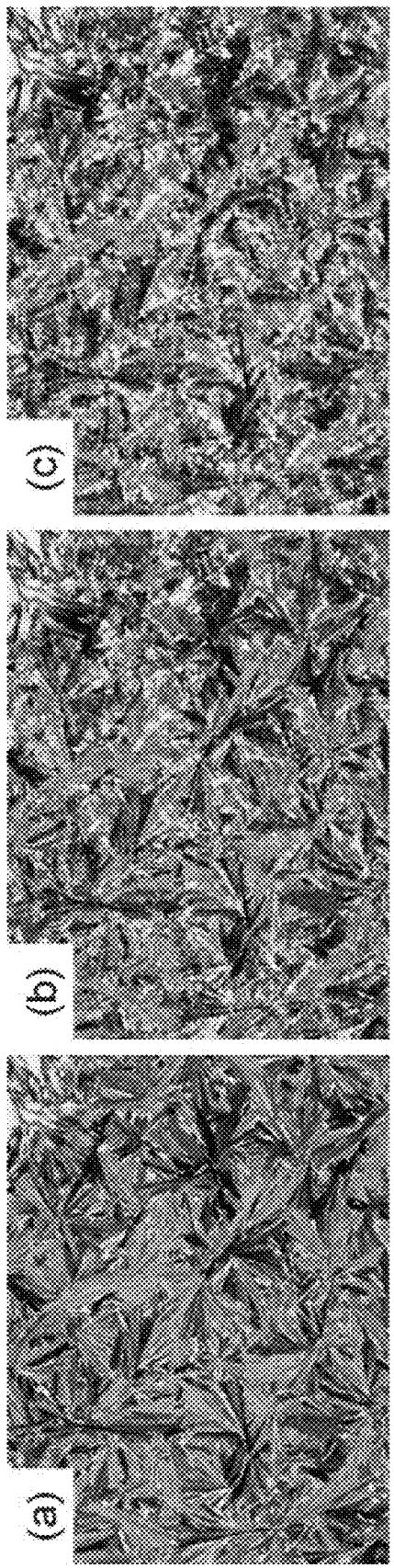

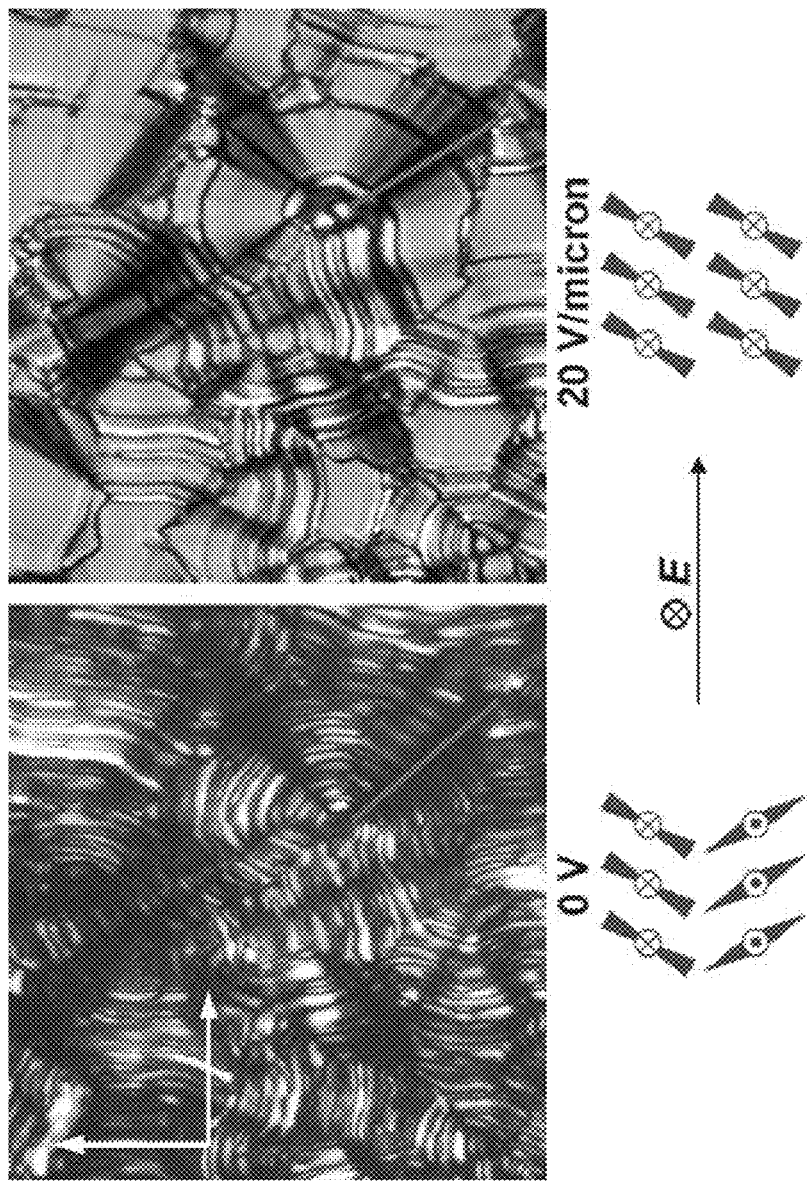

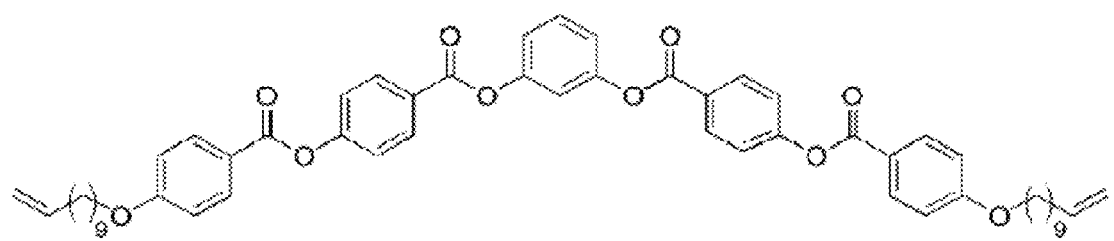
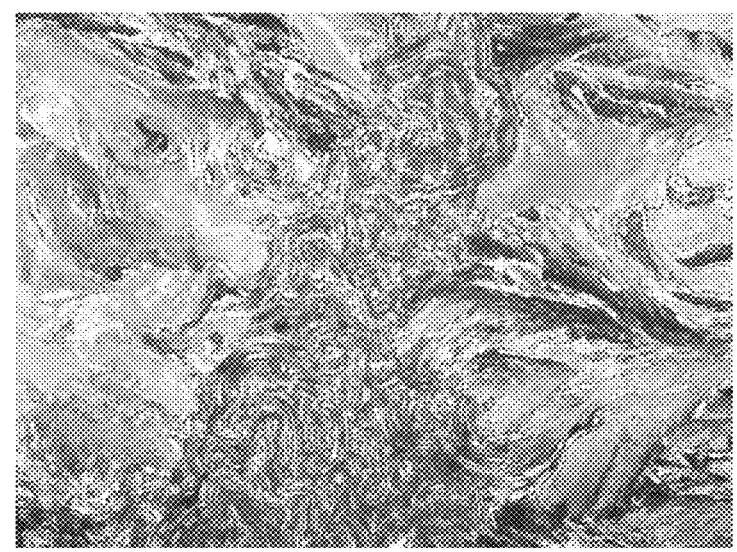
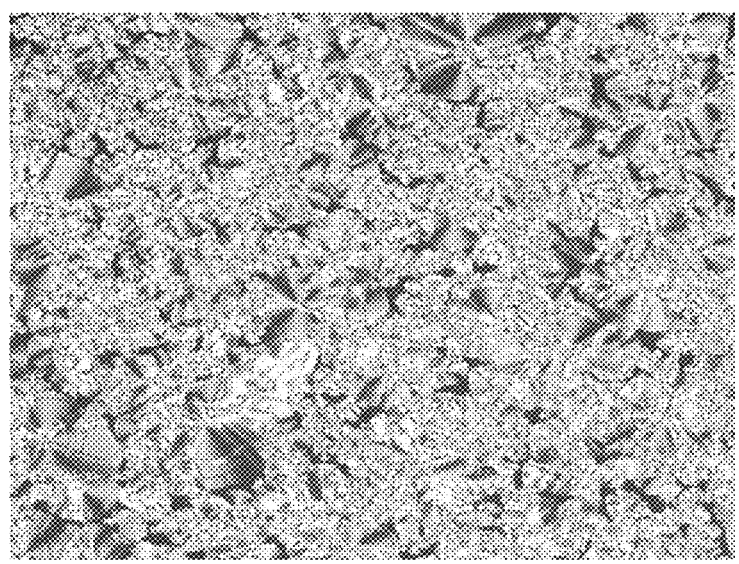
FIG. 12A

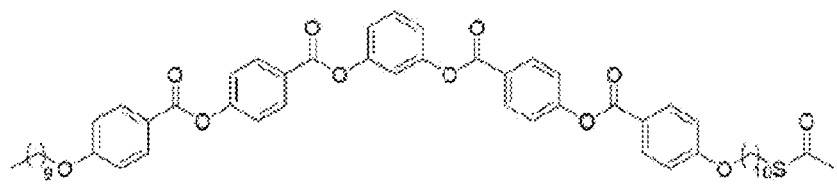
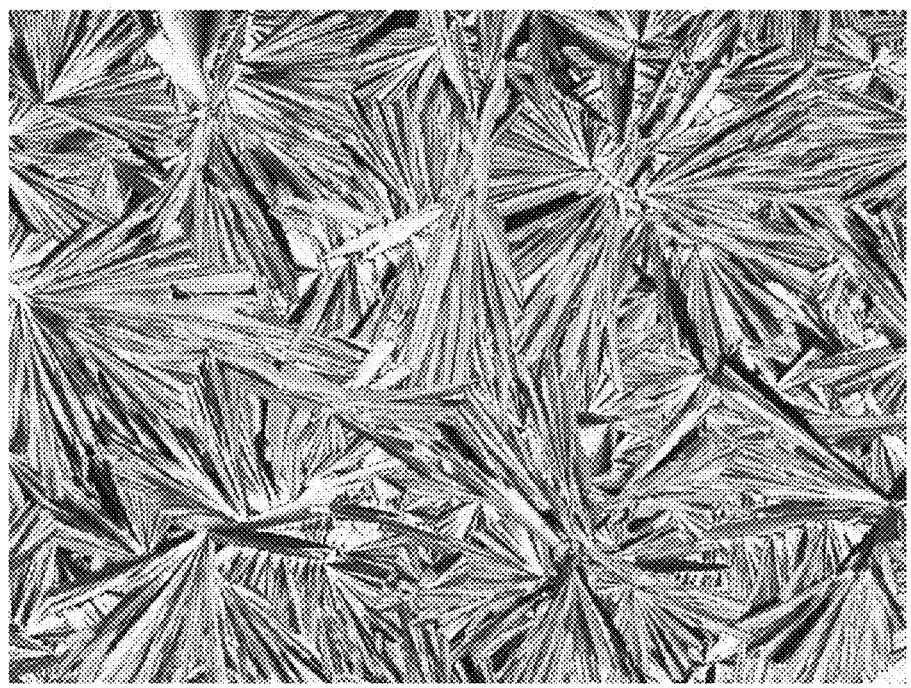
FIG. 13

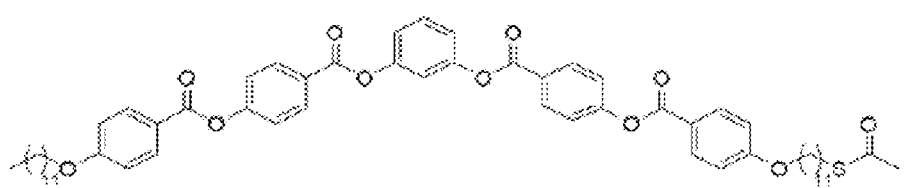
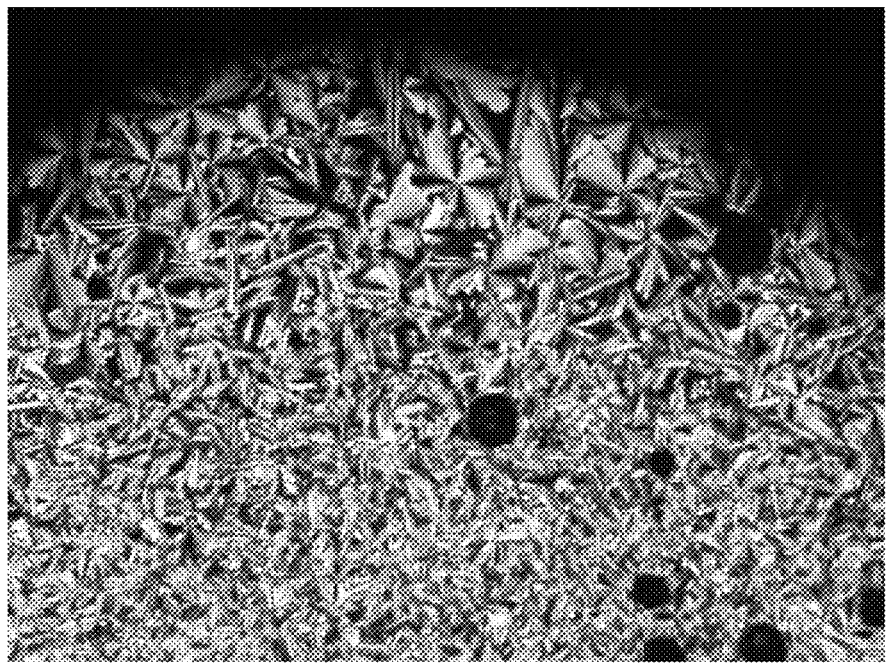
FIG. 14 j)

BENT-CORE LC DECORATED GOLD NANOCLUSTERS

RELATED APPLICATIONS

The present application is a National Phase of International Application No. PCT/CA2008/001884, filed on Oct. 24, 2008, and claiming priority from U.S. Provisional Patent Application Ser. No. 60/982,445, filed Oct. 25, 2007, each of which is incorporated by reference herein in its entirety for all purposes.

FIELD OF THE INVENTION

This invention relates to the preparation of novel bent-core liquid crystals (LCs) having mesomorphic properties and to the use of bent-core LCs to prepare bent-core LC decorated gold nanoparticles [NPs]. NPs have been used to prepare nanoclusters by evaporation from solution or by dispersion of capped gold NPs in a bent-core liquid crystal medium. Such nanoclusters exhibit useful electronic, optical and/or photonic applications.

BACKGROUND OF THE INVENTION

The development of nanoparticles (NPs) covered with organic functional groups has recently excited considerable interest in liquid crystal (LC) nanoscience. Research over the past few years has shown that the presence of NPs dispersed into low molecular mass thermotropic LCs can bring about striking changes to the optical and electro-optic behaviour of LC systems. For example, it has been demonstrated that doping nematic LCs with nanoscale MgO can result in lower operating voltages and shorter response times. Gold nanoparticles in particular have been shown to allow electrically controlled light-scattering when embedded in a nematic LC, allowing for voltage-dependent colour tuning.

In addition, liquid crystalline phases having one or two-dimensional long range orientational ordering also present an excellent choice for the synthesis as well as assembly of NPs into larger, organized structures (arrays) with the added benefit of fluidity imparted by the LC. Hence, the final self-assembled superstructure can be manipulated by external stimuli, a quality not shared by many products of other assembling methods using polymers or surfaces (interfaces) leading to more confined NP arrays.

Thus far, the majority of studies have concentrated on lyotropic liquid crystalline systems as templates or matrices for the patterning of NPs. In addition, most studies involving the effect of NPs on the LC host itself have focused on conventional rod-like LCs.

We have extended such studies to the class of thermotropic liquid crystalline compounds which have come to be known as bent-core or "banana-shaped" LCs. Bent-core compounds exhibit unique properties (for example, high polarization values and second-order susceptability coefficients) which recommend them for use in pyroelectric or piezoelectric applications in non-linear optical (NLO) devices or in dispersive devices similar to polymer-dispersed liquid crystals (PDLCs).

SUMMARY OF THE INVENTION

There are a number of aspects to the present invention, a way of making thiol-terminated bent-core liquid crystals, using these to decorate metal (Au) nanostructures (in particular, nanoparticles) and the use and sytheses of thioacctate and xanthate functional groups to bring about attachment to gold nanoparticles. Bent-core decorated nanoparticles according to the invention have been found to be reasonably soluble in bent-core liquid crystal hosts, affording LC systems with desirable electroco-optical properties, in particular a more rapid switching time stemming from rapid polarization of the LC in response to an applied electric field.

According to a first aspect of the invention, novel thiol-, thioacetate-, and xanthate-terminated bent-core LC compounds have been prepared. These have been shown to have useful mesomorphic properties. The thiol-terminated bent-core compounds have been successfully attached to gold nanoparticles, which display self-assembly behavior out of solution.

According to a further aspect of the invention, there is provided a method for preparing bent-core liquid crystal decorated gold nanoclusters by agitating a solution of gold nanoparticles with a bent-core liquid crystal compound in a suitable solvent, slowly evaporating the solvent and drying the mixture.

According to a futher aspect of the invention, there is provided a method for preparing bent-core liquid crystal decorated gold nanoclusters by using bent-core LCs as monolayer capping agents directly bound to the NP surface and dispersing the capped gold nanoparticles in a bent-core liquid crystal host medium to promote the self-assembly of bent-core liquid crystal decorated gold nanoclusters into arrays.

According to a still further aspect of the invention, there is provided a method for enhancing spontaneous polarization in an SmCPA by dispersing therein bent-core decorated liquid gold nanoclusters.

DESCRIPTION OF THE DRAWINGS

The invention will now be described, first in broad general terms, then by way of a number of specific examples in connection with the attached drawings, in which

FIG. 8 comprises two photomicrographs showing textures of the SmCPa of the synthesized bent-core derivative BC1 at 0V and at +100V.

FIGS. 12A and 12B are respectively polarized optical photomicrograph images and DSC trace for BC3, illustrating the appearance of an unknown mesophase M$_2$, upon cooling below SmCP$_A$ phase.

FIG. 13 is a polarized optical photomicrograph of BC9, illustrating the texture of a crystalline modification appearing at 80° C. upon cooling.

FIG. 14 is a polarized optical photomicrograph of the texture of a crystalline modification of BC14 at 74° C. on cooling.

GENERAL DESCRIPTION OF THE INVENTION

Materials and Measurements

Figure 1:
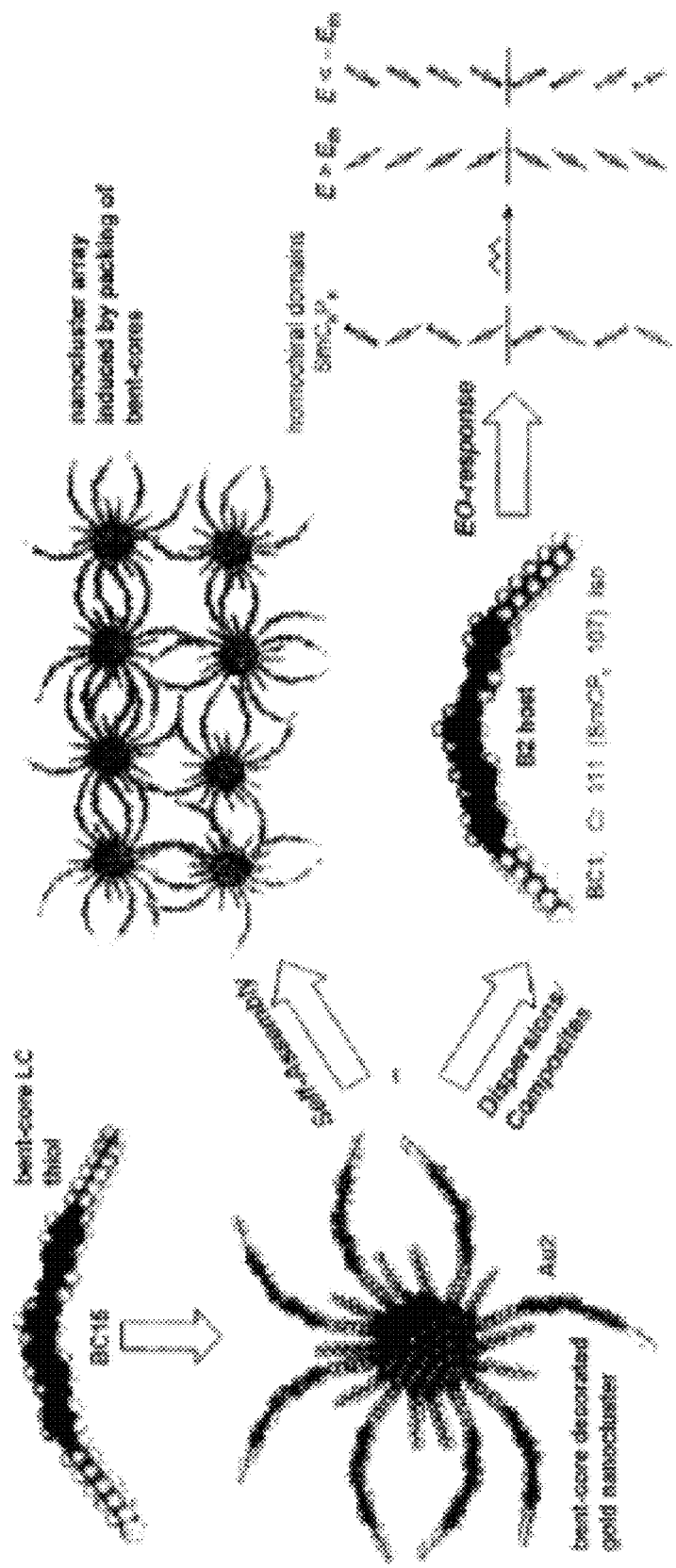
FIG. 1 is schematic representation of the use of thiol-terminated bent-core compounds in assisting the formation of gold nanoparticle arrays (upper section of drawing) and the use of such nanoclusters in dispersions with bent-core LC hosts potentially altering their thermal properties and/or their electro-optic response (lower section).

All solvents used for the synthesis of the gold nanoclusters and the LCs were Aldrich purification grade purified by using a PureSolv™ solvent purification system (Innovative Tech. Inc.). 1H and 13C NMR spectra were acquired using a Bruker Avance™ 300 MHz spectrometer, and MALDI-MS spectra were acquired using a Bruker Biflex™ IV (MALDI-TOF) instrument with a 337 nm laser, acquired in positive ion reflecting mode. Elemental analysis was performed at Guelph Chemical Laboratories (Guelph, Ontario, Canada). Melting points, phase transition temperatures, and the corresponding enthalpy values of all final bent-core compounds were determined by means of a Perkin-Elmer Pyris Diamond™ differential scanning calorimeter (DSC), obtained on the first cycle of heating and cooling at a rate of 10° C./min. Images of LC textures were acquired upon cooling at a rate of 2-3° C./min using an Olympus™ BX51-P polarized light microscope (POM) equipped with a Linkam™ LS530 heating/cooling stage.

Small-angle X-ray scattering (SAXS) measurements of the pure LCs employed a Bruker-Nonius™ FR591 rotating-anode generator with a copper anode operated at 3.4 kW. The beam was collimated and focused with mirror-monochromator optics and the scattered radiation was detected using a Bruker Hi-Star™ wire (area) detector. Samples were sealed in 1 mm diameter glass capillaries. Measurements were made at fixed sample-detector distances of 54 and 124 cm; the final refinement of the unit cell parameters was made using the data from the 54 cm configuration. In-situ temperature-dependent measurements employed a custom Linkam heating cell. Primary data analysis was performed using Datasqueeze™. The changes of textures under electric field and spontaneous polarization were studied/measured in glass cells with ITO electrodes (Instec) using an LCAS I LC-testbed (LC Vision). X-ray diffraction (XRD) patterns for gold nanoparticles were obtained on an MPD X'Pert™ system (PANalytical) using CuK$_\alpha$, radiation (40 kV, 200 mA), measured in reflection geometry using a zero-background flat sample holder. UV-vis spectra were obtained using a Varian Cary™ 5000 UV-vis-NIR spectrophotometer, which was also interfaced with the Linkam LS350 heating/cooling stage for high-T measurements on thin LC films doped with gold NPs. High-resolution transmission electron microscopy (HR-TEM) images were obtained on a Jeol™ ultra-high resolution FEG-T/STEM instrument operating at an accelerating voltage of 200 kV. A 10 μL drop of the isolated gold colloid solution was drop-cast on a carbon coated copper grid (400 mesh) and dried for 1 h. (TEM image analysis of more than 200 particles—Software: Scion Image Beta 4 and Image J).

Synthesis of Bent-Core Compounds

Detailed synthetic information of all intermediates 1-25 and all final bent-core compounds BC1-BC16, including yields, as well as H/C NMR, MALDI-MS, and elemental analysis data are provided in the DETAILED DESCRIPTION OF EXPERIMENTAL EXAMPLES below. Symmetrically substituted bent-core compounds were synthesized according to Scheme 1, and asymmetric derivatives were prepared according to Scheme 2 following standard DCC esterification procedures. The xanthogenate (or xanthate) intermediates (8, 14, and 20) as well as BC7 were synthesized by reacting the Ω-bromoalkane substituted compounds with potassium o-ethylxanthogenate. All thioacetate derivatives (BC9, BC14) were prepared by a photochemical anti-Markovnikov addition to the alkene-terminated derivatives (BC8, BC13) using AIBN as radical initiator. The free thiols (BC5, BC10, and BC15) were then obtained by treatment of the thioacetate derivatives with concentracted HCl in MeOH/THF under reflux.

Scheme 1
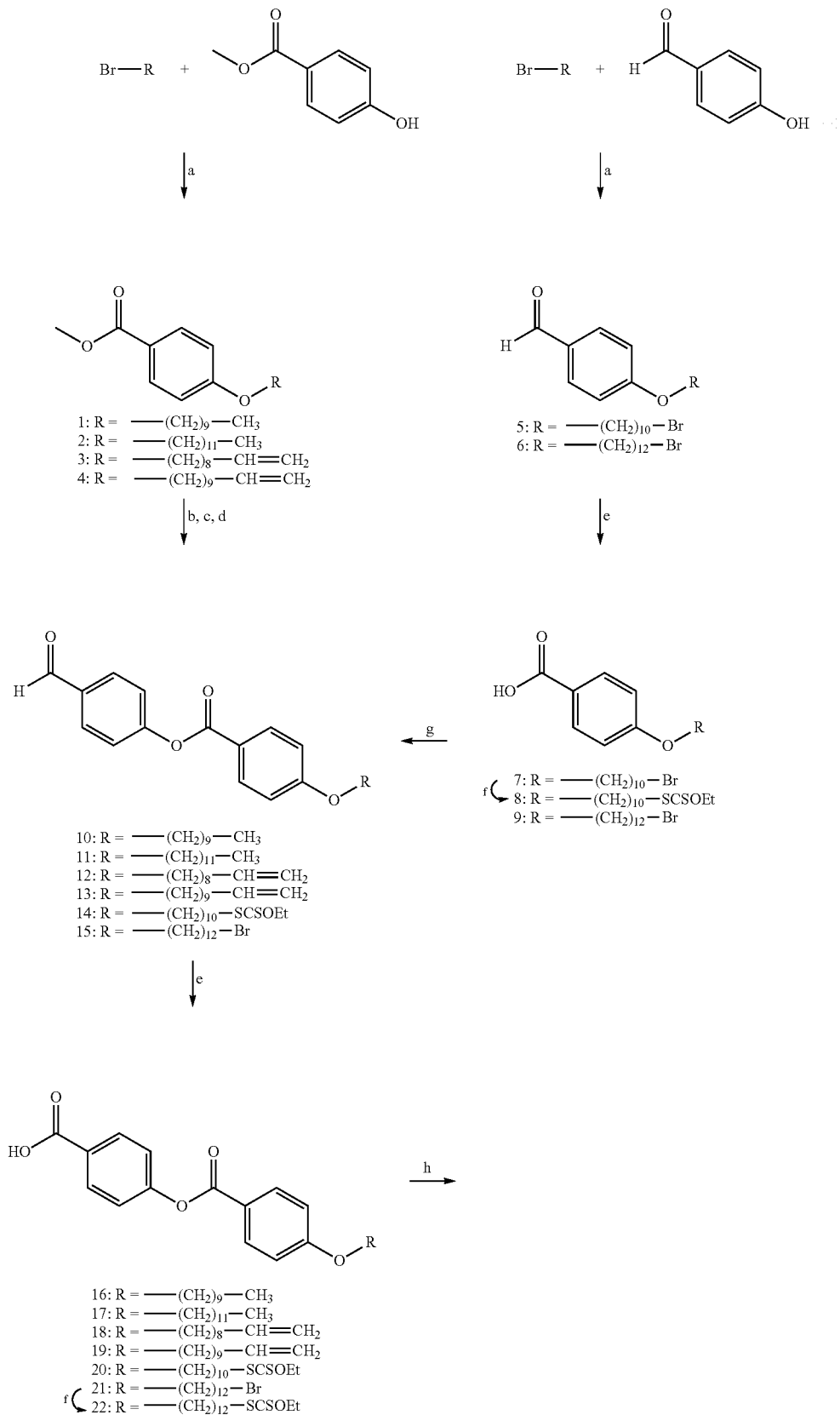

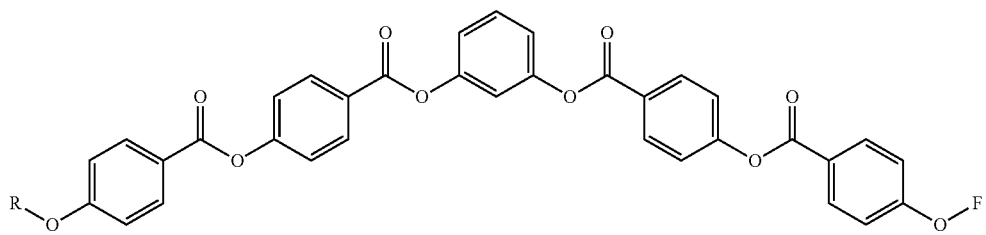

BC1: R = —(CH$_2$)$_9$—CH$_3$
BC2: R = —(CH$_2$)$_{11}$—CH$_3$
i ⌈ BC3: R = —(CH$_2$)$_9$—CH=CH$_2$
  ⌊ BC4: R = —(CH$_2$)$_{11}$—SCOCH$_3$
j ⌊ BC5: R = —(CH$_2$)$_{11}$—SH
f ⌈ BC6: R = —(CH$_2$)$_{12}$—Br
  ⌊ BC7: R = —(CH$_2$)$_{12}$—SCSOEt

Synthesis of symmetrically substituted bent-core derivatives.
a) K$_2$CO$_3$, MeCN, reflux; b) KOH, EtOH, reflux[22]; c) (CO)$_2$Cl$_2$, toluene, reflux;
d) p-hydroxybenzaldehyde, triethylamine, DMAP, CH$_2$Cl$_2$, 25° C. → reflux[23];
e) NaClO$_2$, NaH$_2$PO$_4$·H$_2$O, resorcinol, t-butanol[24]; f) KSCSOEt, acetone, 0° C.[25];
g) p-hydroxybenzaldehyde, DCC, DMAP, CH$_2$Cl$_2$, 25° C.;
h) resorcinol, DCC, DMAP, CH$_2$Cl$_2$, 25° C.; i) CH$_3$COSH, AIBN, THF, hv, 25° C.[26];
j) 12M HCl, MeOH/THF, reflux[27].

Scheme 2

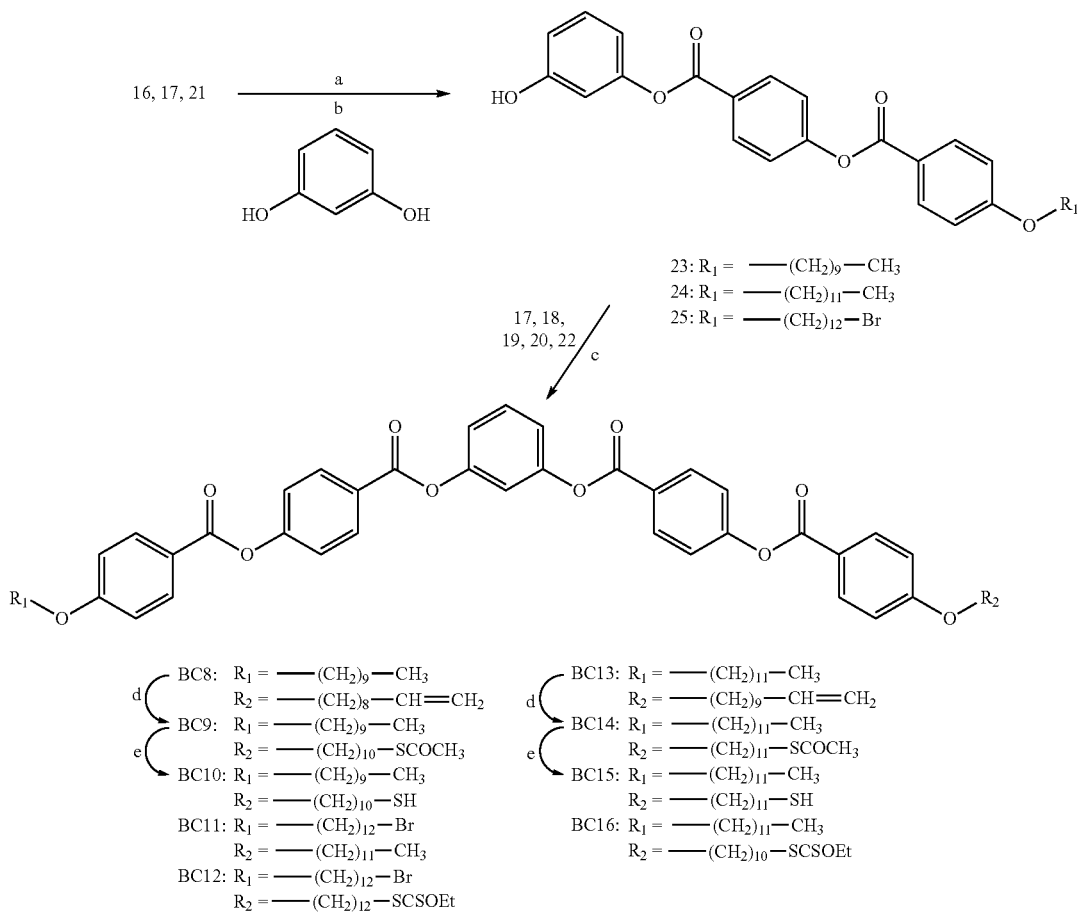

23: R$_1$ = —(CH$_2$)$_9$—CH$_3$
24: R$_1$ = —(CH$_2$)$_{11}$—CH$_3$
25: R$_1$ = —(CH$_2$)$_{12}$—Br

BC8: R$_1$ = —(CH$_2$)$_9$—CH$_3$
      R$_2$ = —(CH$_2$)$_8$—CH=CH$_2$
d ⌈ BC9: R$_1$ = —(CH$_2$)$_9$—CH$_3$
       R$_2$ = —(CH$_2$)$_{10}$—SCOCH$_3$
e ⌊ BC10: R$_1$ = —(CH$_2$)$_9$—CH$_3$
        R$_2$ = —(CH$_2$)$_{10$—SH
BC11: R$_1$ = —(CH$_2$)$_{12}$—Br
      R$_2$ = —(CH$_2$)$_{11}$—CH$_3$
BC12: R$_1$ = —(CH$_2$)$_{12}$—Br
      R$_2$ = —(CH$_2$)$_{12}$—SCSOEt

BC13: R$_1$ = —(CH$_2$)$_{11}$—CH$_3$
      R$_2$ = —(CH$_2$)$_9$—CH=CH$_2$
d ⌈ BC14: R$_1$ = —(CH$_2$)$_{11}$—CH$_3$
       R$_2$ = —(CH$_2$)$_{11}$—SCOCH$_3$
e ⌊ BC15: R$_1$ = —(CH$_2$)$_{11}$—CH$_3$
        R$_2$ = —(CH$_2$)$_{11}$—SH
BC16: R$_1$ = —(CH$_2$)$_{11}$—CH$_3$
      R$_2$ = —(CH$_2$)$_{10}$—SCSOEt

Synthesis of asymmetric derivatives:
a) (CO)$_2$Cl$_2$, toluene, reflux; b) triethylamine, DMAP, CH$_2$Cl$_2$, 25° C. → reflux[23];
c) DCC, DMAP, CH$_2$Cl$_2$, 25° C.; d) CH$_3$COSH, AIBN, THF, hv, 25° C[26].; e) 12M HCl, MeOH/THF, reflux[27].

Synthesis of the Gold Nanoclusters

Figure 5A:
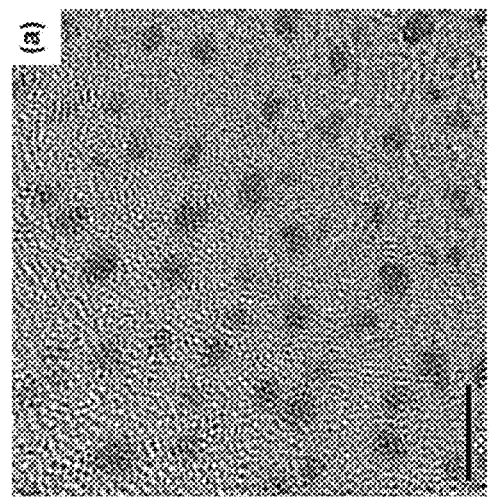
FIG. 5 comprises copies of high-resolution TEM images of the gold nanoclusters Au1 and Au2 referred to in the present description.
Figure 5B:
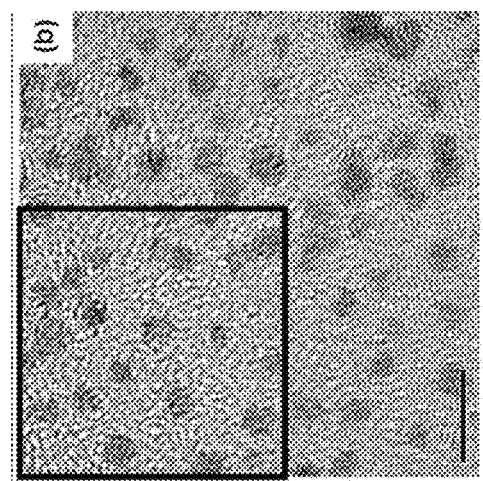
Figure 5C:
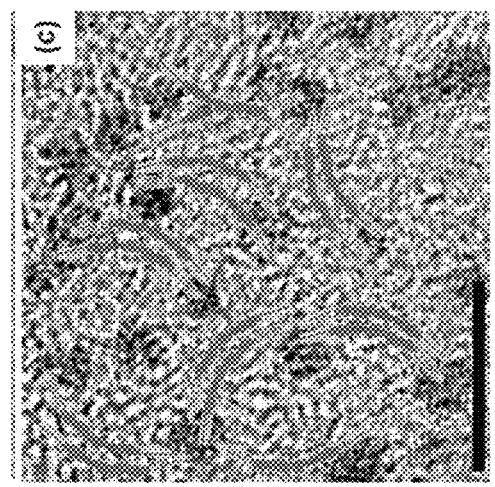

All glassware was thoroughly cleansed with Aqua Regia, rinsed with deionized water (Millipore, resistivity 18.2 MΩ), and dried at 120° C. overnight prior to use. Gold nanoparticles capped with hexanethiol and simultaneously with either compound BC10 or BC15 were prepared according to a modified, one-phase Brust-Schiffrin procedure, without the use of TOAB as a phase transfer agent, and characterized by H NMR, UV-vis, HR-TEM, and powder XRD. The average sizes of the gold nanoclusters as determined by HR-TEM and XRD are summarized in Table 1, and HR-TEM images (obtained from a 1 mg/mL solutions of the gold nanoclusters in toluene) are provided in FIG. 5. High-resolution TEM images of (a) Au1 and (b) Au2 obtained after drop-casting solutions (1 mg/mL) in toluene on carbon-coated copper grids. The highlighted area in (b) is shown in a magnified view in (c). The models of the bent-core compound BC15 in (c) are drawn to scale. One can clearly see that the average distance between most of the Au NPs in the displayed segment of the TEM image as in (a) for Au1 and (b) for Au2 match the length of the bent-core molecules. (Scale bars=5 nm).

The ratio of the two bent-core thiol derivatives BC10 and BC15 to hexanethiol capping the mixed-monolayer gold NP surface was estimated using characteristic peaks in the $^1$H NMR spectra of the NPs, i.e. by comparing the ratio of the integration of the methoxy peak at 4.03 ppm (due to compound BC10 or BC15) to the methyl peak at 0.89 ppm (due to hexane thiolate and compound BC10 or BC15). In both cases, the ratio was determined to be approximately 1:1.

TABLE 1

Size (size distribution) of the gold nanoclusters Au1 and Au2.[a]

|  | Ratio-SR | TEM | Particle Size/nm XRD[b] |
|---|---|---|---|
| Au1 | SC$_6$H$_{13}$/BC10 ~ 1:1 | 2.8 ± 0.6 | 3.9 ± 1.5 |
| Au2 | SC$_6$H$_{13}$/BC15 ~ 1:1 | 2.5 ± 0.5 | 2.4 ± 0.8 |

[a]The total number of thiolates n (sum of hexane- and bent-core thiolates) covering the gold NP depends on the size of the NP core.
[b]Calculated from the wide-angle powder XRD pattern using the Scherrer equation.

Preparation of LC/Gold NP Mixtures

Mixtures of 2.5, 5, 10, and 15 wt % of Au1 and Au2 in LCs BC1 and BC8 were prepared by stirring (agitating) a solution of both components in anhydrous purification grade solvents (e.g. toluene or CH$_2$Cl$_2$). The solvent was then evaporated by a steady stream of N$_2$ over the open glass vials, and the mixtures were dried under vacuum for 18 hours. Prior to investigating the thin films sandwiched between non-treated microscope glass slides or filling of polyimide coated ITO cells (cell gap: 5 μm, antiparallel planar alignment, low pretilt—Instec Inc.), all mixtures were tempered at the isotropic/LC phase transition (~107° C. after initial heating to the isotropic liquid phase and subsequent cooling), and continuously mixed. After cooling to room temperature under N$_2$, samples were taken for DSC measurements as well.

Mesomorphic Properties of Derivatives Bent-Core LC Compounds

The mesomorphic properties of all bent-core derivatives (BC1-BC16) were investigated by POM, DSC, and some selected samples additionally by small-angle X-ray scattering. The data of these investigations are summarized in Table 2, below.

At this point, it should be noted that compounds BC1, BC2, BC3, BC8, and BC13 with methyl- or alkene-terminated hydrocarbon chains were previously reported by other groups, and served in this work either as intermediates or as hosts for the final bent-core decorated gold nanoclusters. The discussion of the mesomorphic properties will therefore focus on the novel symmetric and unsymmetric bromo-, xanthate-, thioacetate-, as well as thiol-terminated bent-core compounds, identified as BC4, BC5, BC6 and BC7 (symmetric); and BC9, BC10, BC11, BC12, BC14, BC15 and BC16 (asymetric).

The most striking difference between the two series of novel symmetric and unsymmetric bent-core compounds is that, while none of the symmetric derivatives display any liquid crystalline behaviour, the majority of the unsymmetric derivatives do. In particular the bis(thioacetate), the bis(bromo)-, and the bis(xanthate) compounds BC4, BC6, and BC7 show a series of crystal-crystal phase transitions as observed by DSC, but no formation of a typical LC texture could be observed by POM that could be sheared between microscope glass slides. The lack of liquid crystallinity of the bis(thiol)-terminated bent-core compound BC5 was here particularly surprising, but is most likely related to the ability of the two thioalcohol groups to participate in intermolecular H-bonding to carbonyl groups of neighboring molecules disrupting the formation of layers or layer segments (ribbons).

For the bis(thioacetate) BC4 with C11-spacers and the bis(xanthate) BC7 with C12 spacers, although both samples can be supercooled by up to 30° C. below the melting point measured on heating, the bulkiness of the terminal groups appears to prevent the formation of tilted or non-tilted LC layer structures (i.e. SmCP or SmAP phases) or ribbons organizing in Col$_r$ (B1 phase) or Col$_{ob}$ lattices.

The same trend continues for the two mono(thioacetate) derivatives BC9 and BC14. Both compounds in their DSC traces show one major peak on heating at 84° C. and 91° C., respectively (BC14 shows an additional low-T crystal-crystal phase transition), and two phase transition peaks during the cooling runs (supercoolable by ~10° C.), all with very similar phase tansition enthalpie values (see ESI). On cooling from the isotropic liquid phase, both compounds form textures between crossed polarizers that closely resemble textures commonly observed for Col$_r$ or Col$_{ob}$ bent core LCs (see ESI). However, the viscosity of both compounds after the transition from the isotropic liquid phase to the low-T phase is rather high, and the textures show no change under shear. SAXS measurements on the two compounds (performed on heating and cooling in steps as low as 0.5° C.) suggest the formation of disordered (BC14) or multi-layer crystalline phases (BC9, Cr$_{Lam}$, layer spacing d≈19.1 nm) on cooling, which do not show any ferro- or antiferrolectric switching under an applied electric field.

Figure 2B:
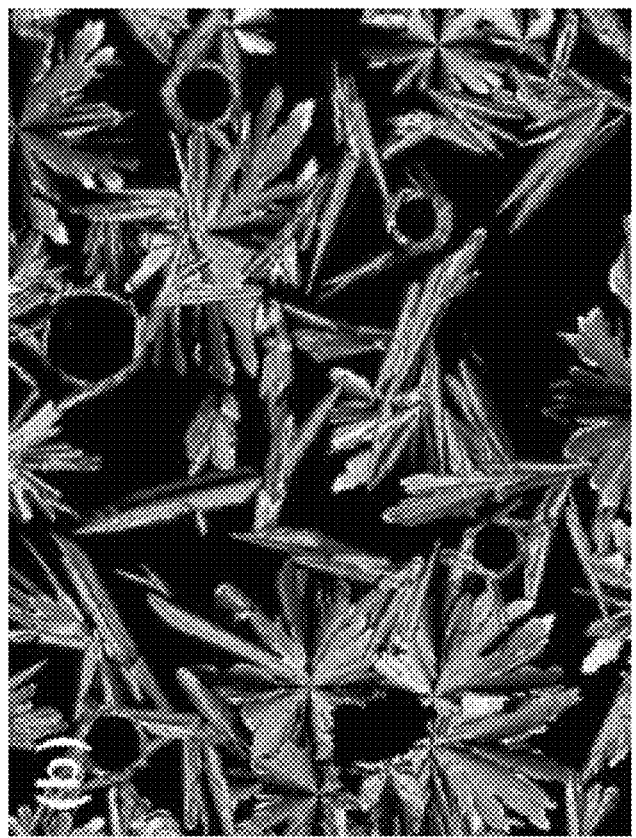
FIG. 2 shows enlarged views, through crossed polarizers, of the textures of the columnar phases obtained, upon cooling from the isotropic liquid phase, for (a) BC12 at 74° C. and (b) BC16 at 78° C.
Figure 2A:
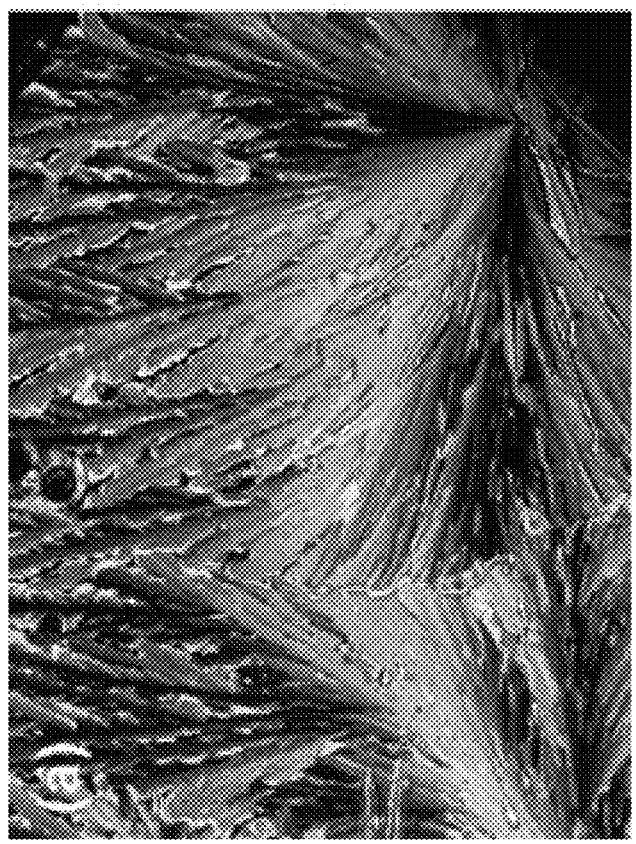

For the two, structurally related mono(xanthate) derivatives (BC12 and BC16), despite the structural similarity to the bis(xanthate) BC7 and the two mono(thioacetate) compounds, DSC, POM, and SAXS indicate the formation of a monotropic LC phase. The textures observed on cooling from the isotropic liquid phase are shown in FIG. 2.

SAXS/WAXS performed on both compounds are consistent with a centered rectangular lattice of a Col$_r$ phase (B1 phase) for BC12 with lattice parameters of a=7.4 nm and b=3.7 nm, and a hexagonal lattice of a Col$_h$ phase for BC16 (that could also be interpreted as a distorted Col$_r$ lattice) with a lattice parameter of a$_{hex}$=4.09 nm. Both mesophases did not show any electro-optic response (switching) under an applied field, and if both are considered Col$_r$ phases, the 2D lattices of these columnar phases are in the plane of the polarization vector (corresponding to the bend direction).

Finally, for the two mono(thiol) derivatives BC10 and BC15, which differ only in the lengths of the hydrocarbon chains, only BC10 with a C9 chain and a C10 spacer between the rigid, bent-core and the terminal thiol group forms a monotropic LC phase, which is only observed in a very narrow temperature interval at faster cooling rates (>3° C. min$^{-1}$).

Figure 3F:
FIG. 3 presents six polarized optical micrographs(a-f) of one of the novel bent-core compounds (BC10) prepared by the invention, following differing cooling and testing treatments.
Figure 3E:
Figure 3D:

The polarized optical micrographs for BC10 shown as (a) to (f) of FIG. 3 were respectively obtained (a) on 1$^{st}$ cooling from the isotropic liquid phase at 89.8° C. at 3° C. min$^{-1}$ (notice the start of crystallization in the upper right hand corner), (b) on further cooling at 3° C. min$^{-1}$ at 87.9° C., (c) on 2$^{nd}$ heating with 3° C. min$^{-1}$ at 95° C., (d) on cooling from the isotropic liquid phase at 96.8° C. at 1° C. min$^{-1}$, (e) on further cooling at 89.8° C. at 1° C. min$^{-1}$, and (f) at 87.8 ° C. at 1° C. min$^{-1}$. Cooling from the isotropic liquid phase at 3° C. min$^{-1}$ produces a fan-like texture [FIG. 3 (a)] that can be sheared, but starts to crystallize out during this process. Further cooling at the same rate results then in a complete crystallization of the entire thin films as shown in FIGS. 3(b) and 3(c).

Figure 4:
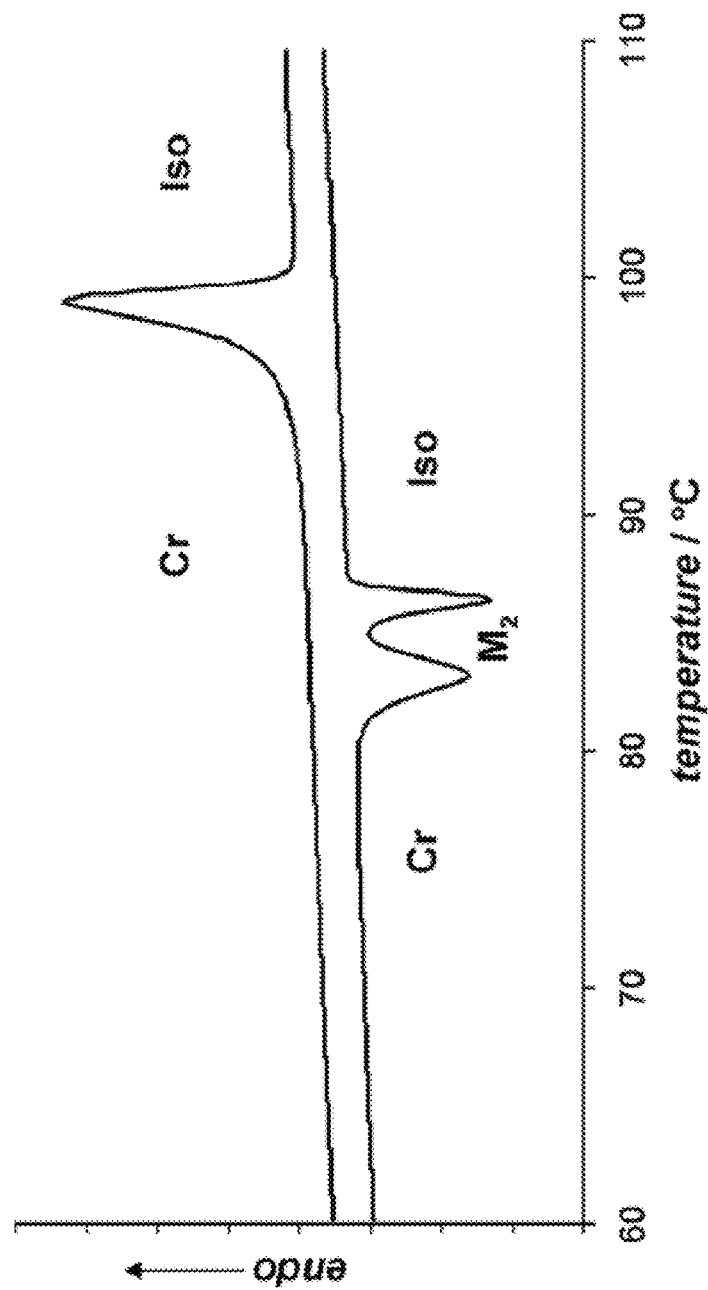
FIG. 4 represents differential scanning calorimetry (DSC) traces of BC10 showing the meta-stable LC phase on cooling between 86° C. and 83° C. Both heating and cooling runs were measured at 10° C. min$^{-1}$.

This phase transition is also clearly observed by DSC performed at a heating/cooling rate of 10° C. min$^{-1}$ (see FIG. 4). At a slower cooling rate of 1° C. min$^{-1}$, crystallization of BC10 sets in at a much higher temperature than at faster cooling rates, and no further crystal-crystal phase transitions can be observed on further cooling [see FIGS. 3(d) to (f)]. Attempts to elucidate the structure of this metastable LC phase using SAXS/WAXS at cooling rates of about 4° C. min$^-$ were regrettably unsuccessful, likely due to the large temperature step size selected to achieve rapid cooling during SAXS experiments.

TABLE 2

Phase transition temperatures (T/° C.), corresponding phase transition enthalpies values (ΔH/kJ mol$^{-1}$), and parameters extracted from SAXS experiments of compounds B1-B16.

| Compd. | $R_1$ | $R_2$ | $m$ | $n$ | transition temperatures (T/° C.) transition enthalpies (ΔH/kJ mol$^{-1}$) | SAXS/WAXS $q_1, q_2, q_3$ (Å$^{-1}$), hkl, lattice parameters (nm) |
|---|---|---|---|---|---|---|
| BC1$^{24,31,32}$ | CH$_3$ | CH$_3$ | 9 | 9 | Cr$_1$ 88 Cr$_2$ 103 Cr$_3$ 111 (SmCP$_A$ 107) Iso<br>4.9  8.4  40.3  (18.9) | —$^c$ |
| BC2$^{24,31,32}$ | CH$_3$ | CH$_3$ | 11 | 11 | Cr 106 SmCP$_A$ 116 Iso<br>41.8  23.1 | —$^c$ |
| BC3$^{24,33}$ | CH=CH$_2$ | CH=CH$_2$ | 9 | 9 | Cr 101 (M$_1{}^a$ 82 SmCP$_A$ 93) Iso<br>48.2  ($^b$)  (16.6) | —$^c$ |
| BC4 | SCOCH$_3$ | SCOCH$_3$ | 11 | 11 | Cr$_1$ 74 Cr$_2$ 76 Iso<br>3.8  70.9 | —$^d$ |
| BC5 | SH | SH | 11 | 11 | Cr 95 Iso<br>31.8 | —$^d$ |
| BC6 | Br | Br | 12 | 12 | Cr$_1$ 74 Cr$_2$ 90 Cr$_3$ 103 Iso<br>10.5  13.0  71.5 | crystal modifications (no wide angle peak at ~0.45 nm) |
| BC7 | SCSOEt | SCSOEt | 12 | 12 | Cr$_1$ 69 Cr$_2$ 76 Iso<br>1.3  23.3 | —$^d$ |
| BC8$^{24}$ | CH$_3$ | CH=CH$_2$ | 9 | 8 | Cr 107 (Col$_r$ 99) Iso<br>57.0  (17.0) | —$^c$ |
| BC9 | CH$_3$ | SCOCH$_3$ | 9 | 10 | Cr$_{Lam}$ 84 Iso<br>43.8 | 1$^{st}$ cooling: q$_1$: 0.147, q$_2$: 0.295; d = 4.3 nm 2$^{nd}$ cooling: q$_1$: 0.131, q$_2$: 0.166, q$_3$: 0.196, q$_4$: 0.228, q$_5$: 0.264, q$_6$: 0.333; d = 19.1 nm |
| BC10 | CH$_3$ | SH | 9 | 10 | Cr 98 (M$_2$ 86) Iso<br>37.7  (20.4) | metastable phase$^e$ |
| BC11 | Br | CH$_3$ | 12 | 11 | Cr$_1$ 78 Cr$_2$ 94 Iso<br>11.8  25.6 | q$_1$: . . . , q$_2$: . . . , q$_3$: . . . , disordered crystal phases |
| BC12 | Br | SCSOEt | 12 | 12 | Cr$_1$ 68 Cr$_2$ 80 (Col$_r$ 75) Iso<br>74.3  32.8  (16.9) | q$_1$: . . . (200), q$_2$: . . . (310), q$_3$: . . . (400), q$_4$: . . . (220), a = 7.4 nm, b = 3.7 nm |

TABLE 2-continued

Phase transition temperatures (T/° C.), corresponding phase transition enthalpies values (ΔH/kJ mol$^{-1}$), and parameters extracted from SAXS experiments of compounds B1-B16.

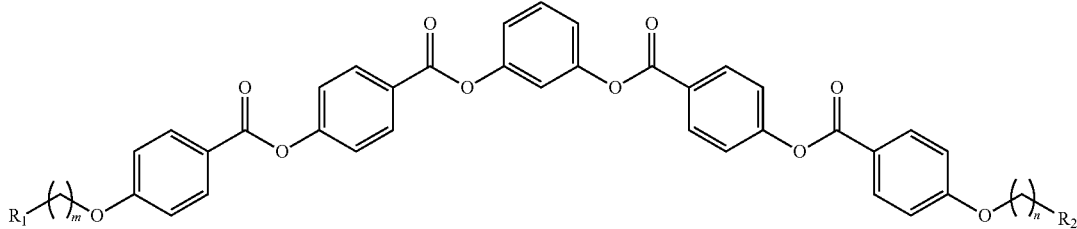

| Compd. | $R_1$ | $R_2$ | $m$ | $n$ | transition temperatures (T/° C.) transition enthalpies (ΔH/kJ mol$^{-1}$) | SAXS/WAXS $q_1, q_2, q_3$ (Å$^{-1}$), hkl, lattice parameters (nm) |
|---|---|---|---|---|---|---|
| BC13[24] | $CH_3$ | $CH=CH_2$ | 11 | 9 | Cr 94 Col$_r$ 107 Iso<br>28.1    16.8 | —[c] |
| BC14 | $CH_3$ | $SCOCH_3$ | 11 | 11 | Cr$_1$ 79 Cr$_2$ 91 Iso<br>13.0    35.2 | high-T: $q_1$: 0.179 (crystal), low-T: crystal modifications (no wide angle peak) |
| BC15 | $CH_3$ | SH | 11 | 11 | Cr$_1$ 59 Cr$_2$ 88 Cr$_3$ 95 Iso<br>3.7    2.4    30.0 | $q_1$: ..., $q_2$: ..., $q_3$: ..., disordered crystal phases |
| BC16 | $CH_3$ | SCSOEt | 11 | 10 | Cr$_1$ 83 Cr$_2$ 86 (Col$_h$ 79) Iso<br>2.7    29.4    (15.4) | $q_1$: ... (100), $q_2$: ... (110), $q_3$: ... (200), $a_{hex}$ = 4.09 nm |

[a]Phase transition and phase here called M$_1$ not reported in [31,33] (for POM image see DETAILED DESCRIPTION, below).
[b]Enthalpy of the shoulder in the DSC trace not calculated.
[c]SAXS not performed on known compounds.
[d]SAXS not performed for clearly crystalline compounds.
[e]Meta-stable phase not observable by SAXS.

Self-Assembly of Bent-Core LC Decorated Nanoclusters

Much of our research was devoted to the assembly of gold nanoclusters owing to the usefulness of these NP assemblies in electronic, optical and photonics applications.

To evaluate if the special molecular packing of the bent-core molecules could be used to organize gold nanoclusters into arrays, we prepared gold NPs using both mono(thiol) bent-core derivatives, Au1 using BC10 and Au2 using BC15. The NPs were synthesised as mixed monolayer-protected NPs to enhance the solubility in common organic solvents as well as in the bent-core LC hosts described below ("Mixtures with bent-core LC hosts").

After drop-casting solutions of both mixed-monolayer gold NPs previously suspended in toluene at a concentration of about 1 mg mL$^{-1}$, both Au1 and Au2 formed large areas of somewhat regular spaced gold nanoclusters visible in the HR-TEM images. At this point it should be noted that one has to be careful with interpreting TEM images and discussing self-assembly of nanoscale particles, since TEM merely produces 2D images of three-dimensional objects. However, analysis of several different images obtained from the same TEM grid revealed that over 60% of the particles are spaced about 3.9 ±0.6 nm edge-to-edge and about 15% 4.4 ±0.5 nm edge-to-edge, which relates well to the molecular length of the bent-core molecules capping the nanoclusters ($L_{BC}$~4.8 nm). Hence, the model predicted in FIG. 1 appears to be a good representation for the assembly of bent-core decorated gold nanoclusters out of solution. A very similar self-assembly process was recently presented by Kumar and co-workers for gold NPs coated with triphenylene-based discotic LCs.

While the conditions for this process have not been optimized at this stage, we have found that the assembly of the nanoclusters to be solvent-dependent in so far that changing toluene for another solvent such as $CH_2Cl_2$ induces a significant degree of aggregation of the gold NPs into three-dimensional nanocluster domains that did not allow for measuring particle-to-particle distances.

Mixtures with Bent-Core LC Hosts

As expected, the pure, isolated gold NPs Au1 and Au2 did not show any liquid crystalline behaviour due to the high melting points (transition temperatures) of the bent-core thiols used, contrary to a report by Mehl et al. for rod-like LCs attached in a side-on fashion to gold NPs. Nevertheless, owing to their mixed monolayer capping, both NPs can be reasonably well dispersed in the two selected bent-core LC hosts, i.e. BC1 forming a SmCP$_A$ phase and BC8 forming a Col$_r$ phase with interesting thermal, self-assembly and electro-optic effects.

Figure 6:
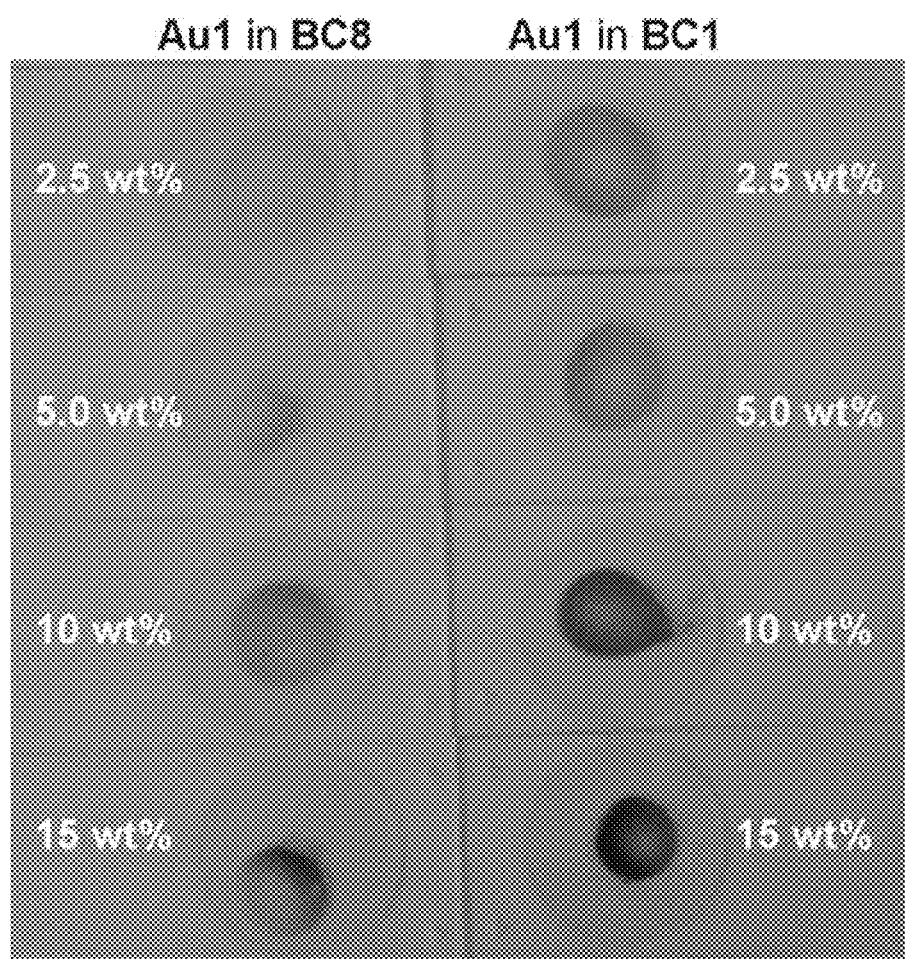
FIG. 6 shows thin film sections of suspensions of different concentrations (wt %) of Au1 in BC8 forming a Col$_r$ phase (left) and in BC1 forming a SmCP$_A$ phase (right) at room temperature after one thermal cycle through the LC phase formed on cooling. The colour (wavelength of the surface plasmon resonance, SPR band) observed for the two sets is distinctly different from one series to the other, but consistent within each series.
Figure 7:
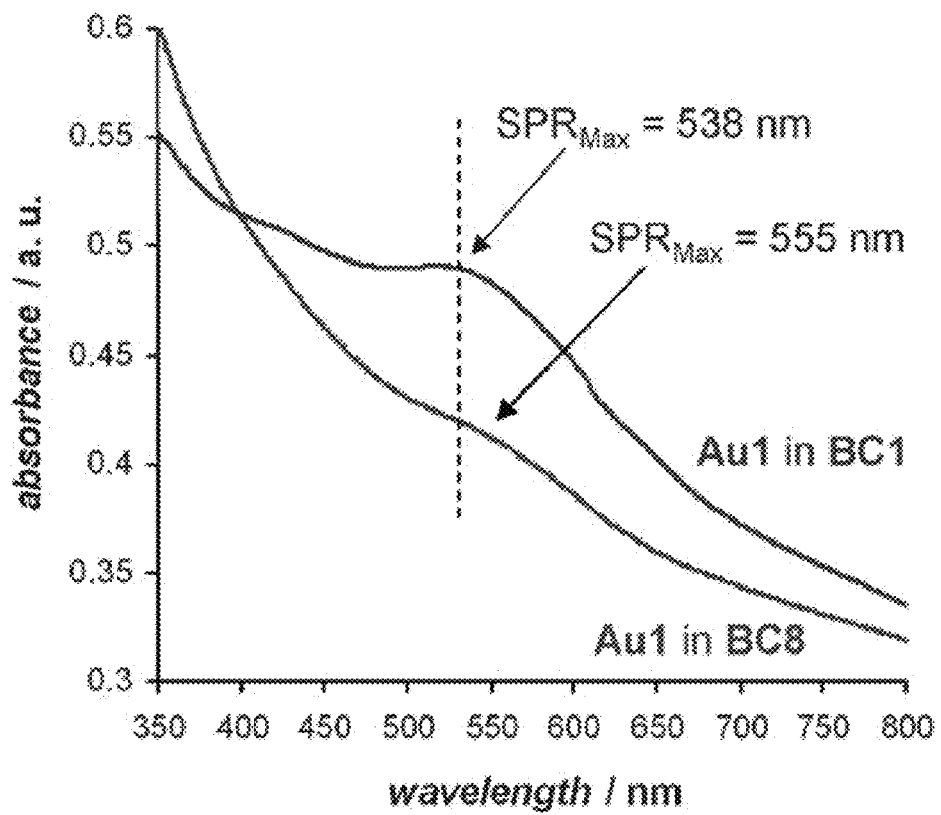
FIG. 7 is a graphic illustration of the shift of the SPR band arising from the change of bent-core host in UV-vis spectra of thin film suspensions of 10 weight percent Au1 in BC1 and BC8, both at 90° C. on cooling from the isotropic liquid phase (both LC hosts in their respective LC phases).

Optically visible, a certain degree of a bent-core LC host-dependent aggregation of the gold NPs in the two different LC hosts provokes a reddish-brown to purple colour change [red-shift of the surface plasmon resonance band from 529 nm of pure Au1 to 538 nm in BC1 and to 555 nm in BC8 [see detailed description of experimental examples, below]. This red-shift, detectable by 'naked' eye (FIG. 6) was also detected by UV-vis spectrophotometry of the binary mixtures in the LC phase of both hosts (FIG. 7).

While the changed surrounding dielectric (toluene vs LC host) influences the spectral position of the SPR band, this effect, which was also observed for Au2 in both, structurally almost identical LC host (the difference is only in the terminal =$CH_2$ group), indicates that the different packing of the two bent-core hosts (SmCP$_A$ vs Col$_r$) influences the aggregation of the bent-core decorated NPs differently as the position of the SPR band does not significantly change with temperature (±3 nm).

Thermal characterization of the composites containing different concentrations of the bent-core decorated NPs in BC1 and BC8 (for a chart of all DSC traces for Au1 in BC1 and BC8 (see the DETAILED DESCRIPTION below) indicates that an increasing concentration of the gold NPs has only a minor influence on the phase transition temperatures on heating (melting point depressions of about −1 °C. for BC1 and about −4 °C. for BC8). From the DSC traces obtained for Au1 in BC1 on heating it is also apparent, that an increasing concentration of the gold NPs increases the phase transition enthalpies of the low-temperature Cr-Cr phase transitions, where the NPs might serve as nucleation sites.

A more drastic effect, however, is observed on cooling. Here, an increase in the NPs concentration results initially (at 2.5wt %) in a significant and then in a gradual (up to 15wt %) decrease in the Iso-LC transition temperature of about −3° C. to −4° C., and of about −10° C. for the LC-Cr phase transition, effectively broadening the temperature interval of both LC phases on cooling.

Motivated by recent reports on the effects of metal nanoclusters primarily on the electro-optic response of nematic LCs, we also performed initial experiments demonstrating how an increasing concentration of the bent-core decorated gold NPs would affect the response of the SmCP$_A$ host BC1 to an applied electric field (sandwiched between ITO-coated 5 μm LC test cells; polyimide alignment layers, low pre-tilt).

Figures 10A, 10B, 10C:
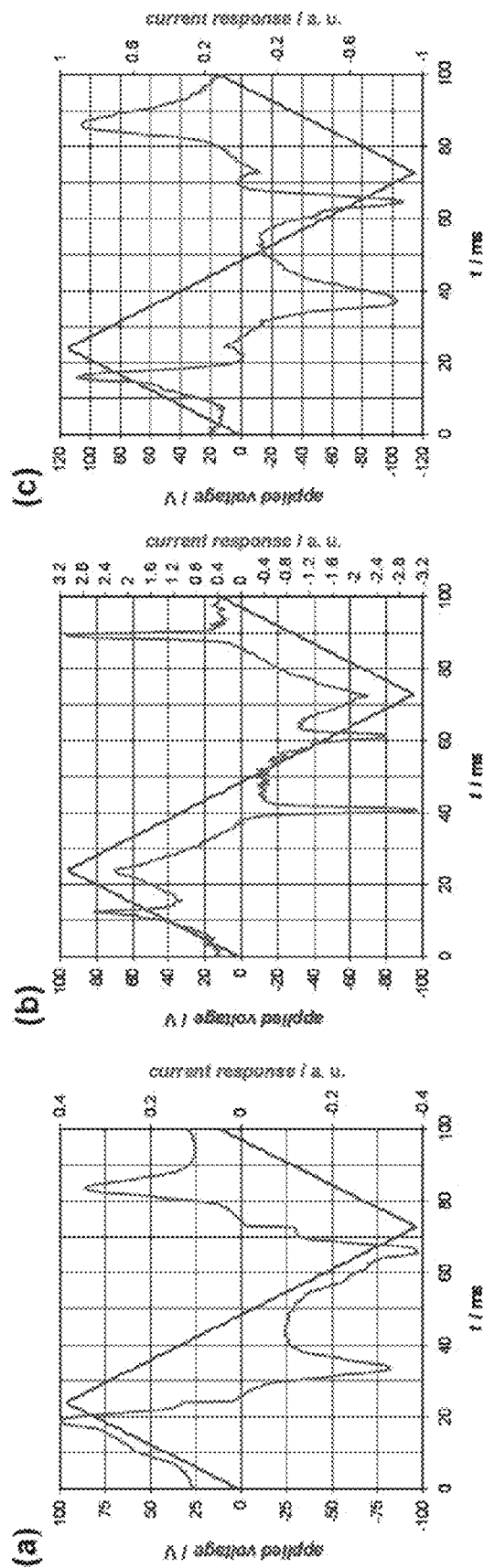
FIG. 10 presents three graphical representations of current response to a triangular voltage in the SmCP$_A$ phase of (a) pure BC1; (b) BC1 doped with 2.5 weight percent Au1; and (c) BC1 doped with 5 weight percent Au2.

The textural change upon applying an electric field and the current response to a triangular voltage in the SmCP$_A$ phase of pure BC1 is shown in FIG. 8 and FIG. 10(a), respectively. FIG. 8 shows the textures of the SmCP$_A$ phase of pure BC1 at 0V (left) and at +100V (right). Cell gap: 5 μm, temperature: 95° C. The models below each POM image show the tilt- and polarization direction of the molecules in the field-OFF state at 0V (anticlinic, antiferroelectric, SmC$_A$P$_A$-left) and in the field-ON state at +100V (synclinic, ferroelectric, SmC$_S$P$_F$-right). FIG. 10 provides three graphical representations of current response to a triangular voltage voltage in the SmCP$_A$ phase of (a) pure BC1, (b) BC1 doped with 2.5wt % Au1, and (c) BC1 doped with 5wt % Au2 (cell gap: 5 μm, temperature: 95° C., applied voltage (peak-to-peak): (a), (b) V$_{pp}$=200V; (c) V$_{pp}$=220 V, frequency: 10 Hz).

Figure 9B:
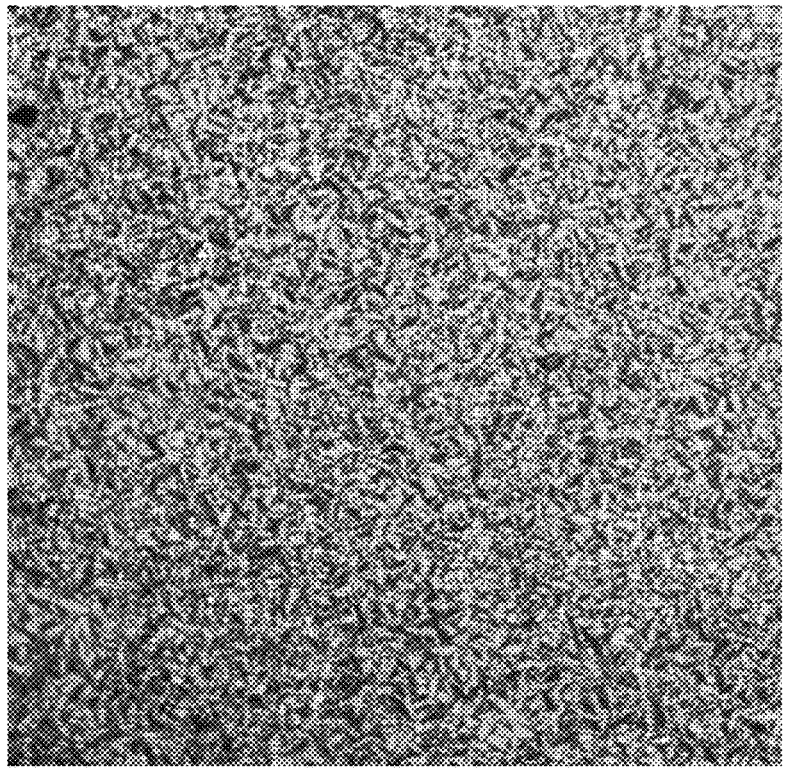
FIG. 9 presents photomicrographs showing the textures of the SmCP$_A$ phase of BC1 doped with 5 weight percent of Au1 at V$_{pp}$=200 V.
Figure 9A:
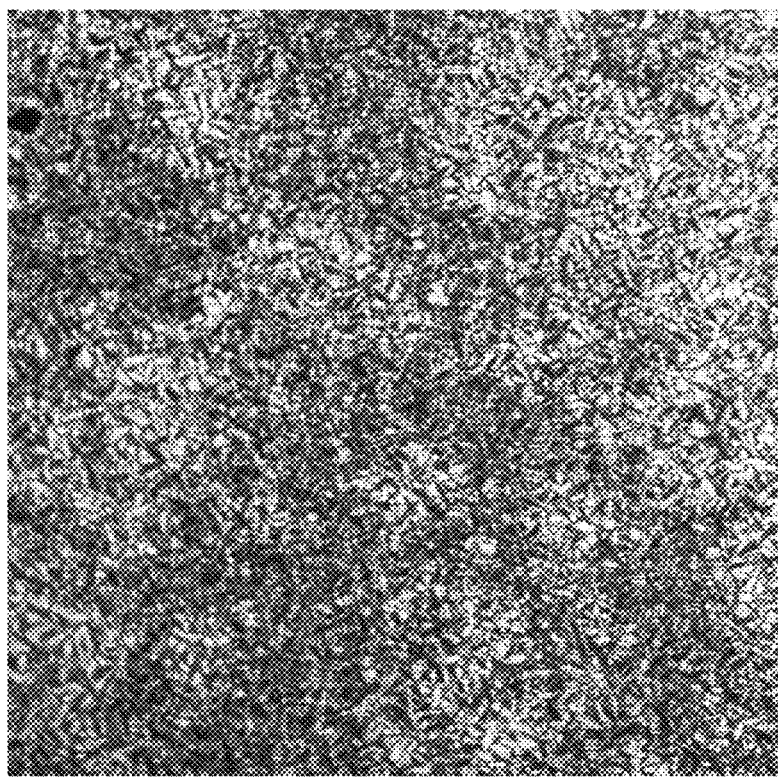

The first important observation made performing these experiments is that the mixtures of BC1 containing varying concentrations of Au1 or Au2 do not display the characteristic circular domains as observed for pure BC1 shown in FIG. 8. All mixtures, more or less, show uncharacteristic multi-domain textures with a different orientation of the smectic layer normal, which are likely the result of local defects induced by the suspended nanoclusters. Nevertheless, all domains remain electro-optically active and respond to an applied electric field. FIG. 9 shows the multi-domain texture photographed at low frequency (0.3 Hz) to demonstrate the non-uniform current response of these multi-domains.

Most interesting, however, is the observation that while the alignment of the SmCP$_A$ phase of BC1 obviously suffers with the presence and an increasing concentration of the gold NPs, measured values for the spontaneous polarization increase by ca. 17% for the the 5wt % Au1 in BC1 mixture (P$_{pure\ BC1}$=649±21 nC cm$^{-2}$, P$_{BC1+5\ wt\ \%\ Au1}$=757±37 nC cm$^{-2}$). Similar increases were also found for BC1 in mixtures containing up to 5wt % Au2. At the same time, the response times increase from about 0.3 ms for pure BC1 to about 0.4 ms for BC1 doped with the gold NPs. While we relate the polarization increase to an enhanced conductivity of the mixtures[44], these initial electro-optic data are rather difficult to interpret at the current stage considering the drastic textural changes (differences in alignment as well as multi-domain formation). The outcome of these measurements, however, warrants more detailed investigations and experiments to clarify and explain the observed effects.

Figure 11:
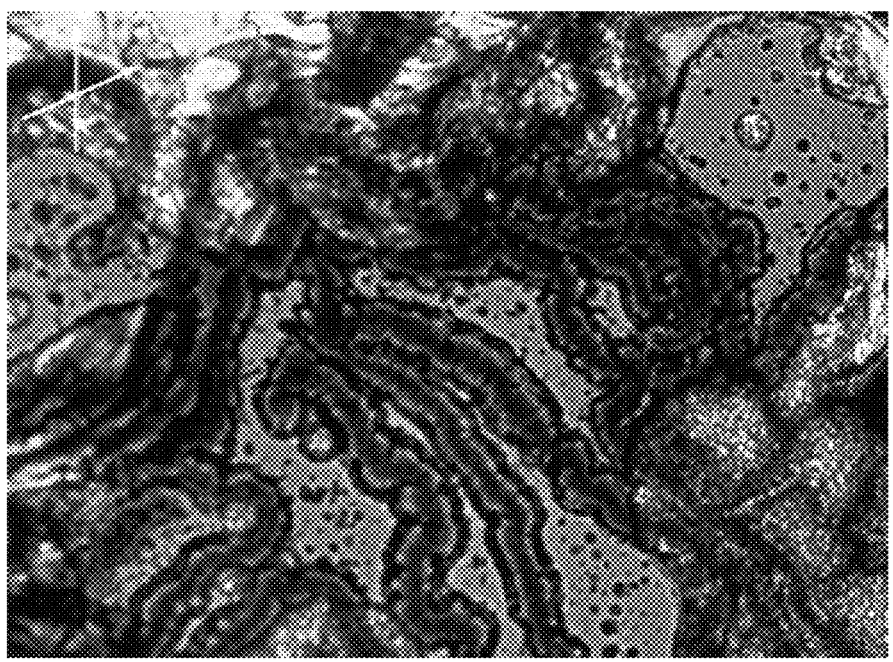
FIG. 11 is a polarized optical photomicrograph of the texture formed by 5 weight percent Au1 in BC1 on cooling at the transition from the isotropic liquid to the SmCP$_A$ phase (100×).
Figure 12B:
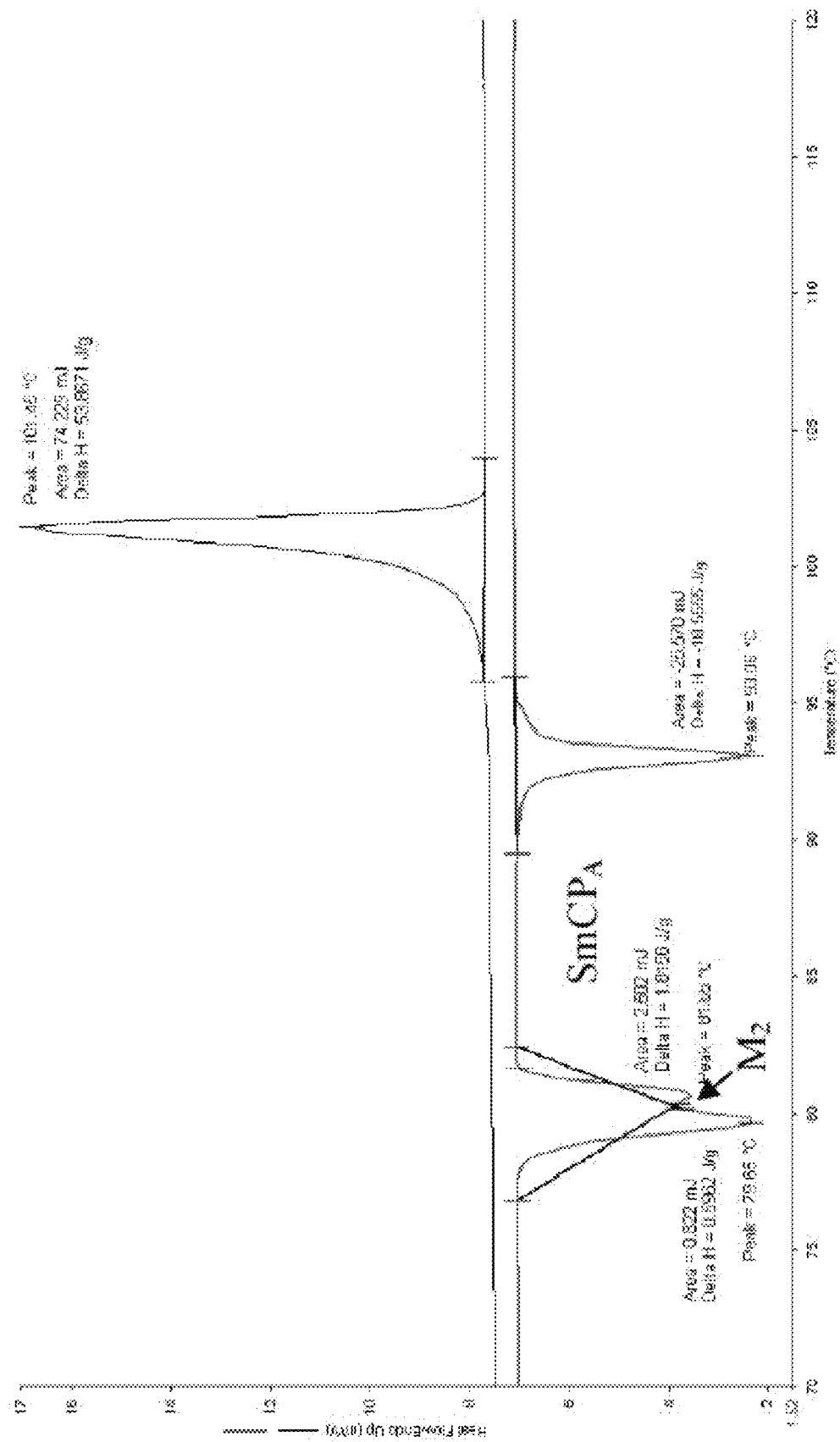
Figure 15A:
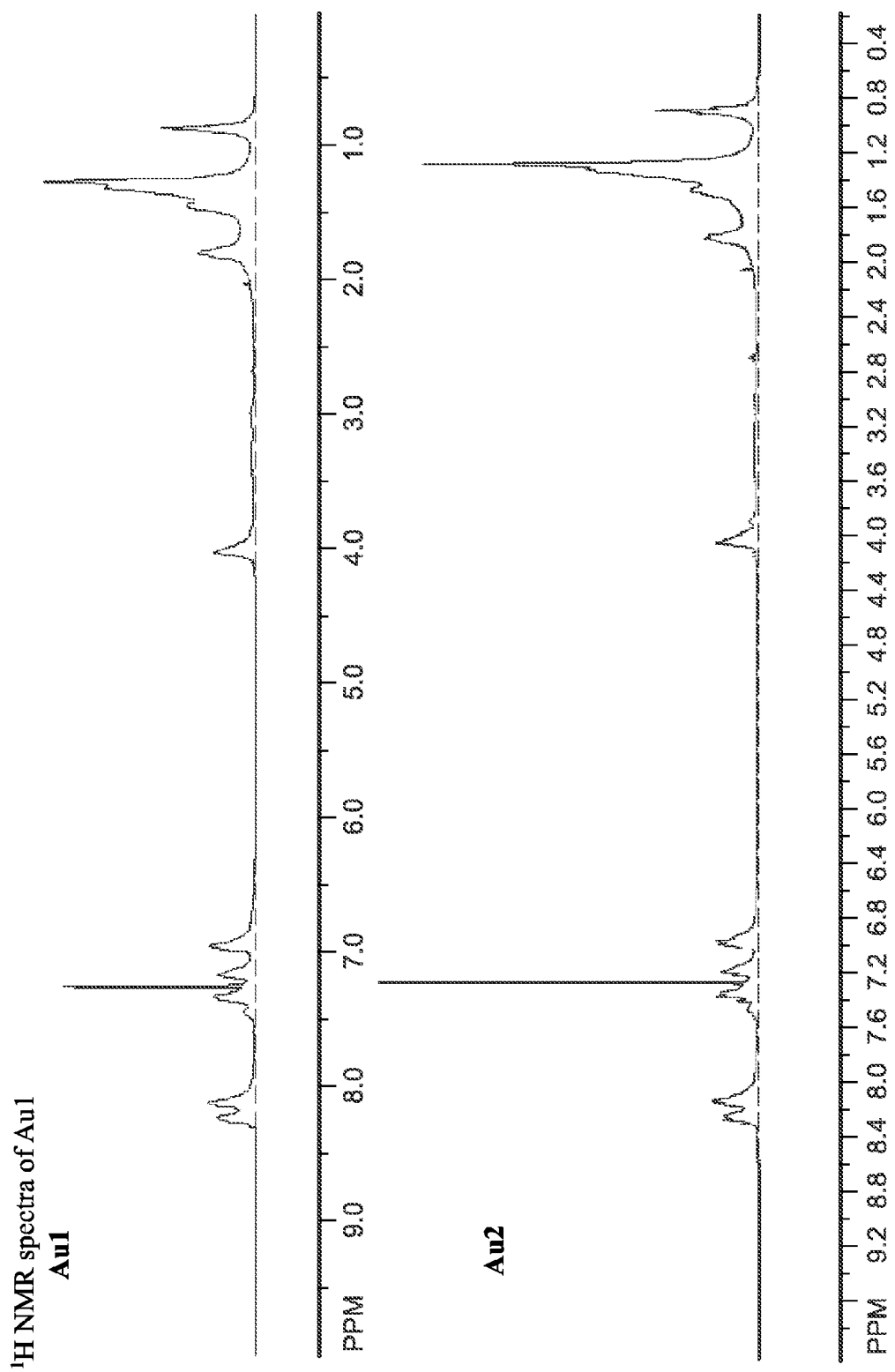
FIG. 15: Spectroscopic and Calorimetric Measurements. (A) 1H NMR spectra of Aug1; (B) UV-vis spectra of Au1 and Au2; (C) DSC traces of BC9 and BC14; (D) DSC traces of Au1/BC1 and AlII/BC8 composites. DSC traces acquired on the first round of heating and cooling at a rate of 10° C./min of a) pure BC1, and BC1 doped with b) 2.5 wt% AuI, c) 5 wt% AuI, d) 10 wt% AuI, and e) 15 wt% AuI, as well f) pure BC8, and BC8 doped with g) 2.5 wt% AuI, h) 5 wt% AuI, i) 10 wt% AuI, and j) 15 wt% AuI.
Figure 15A:
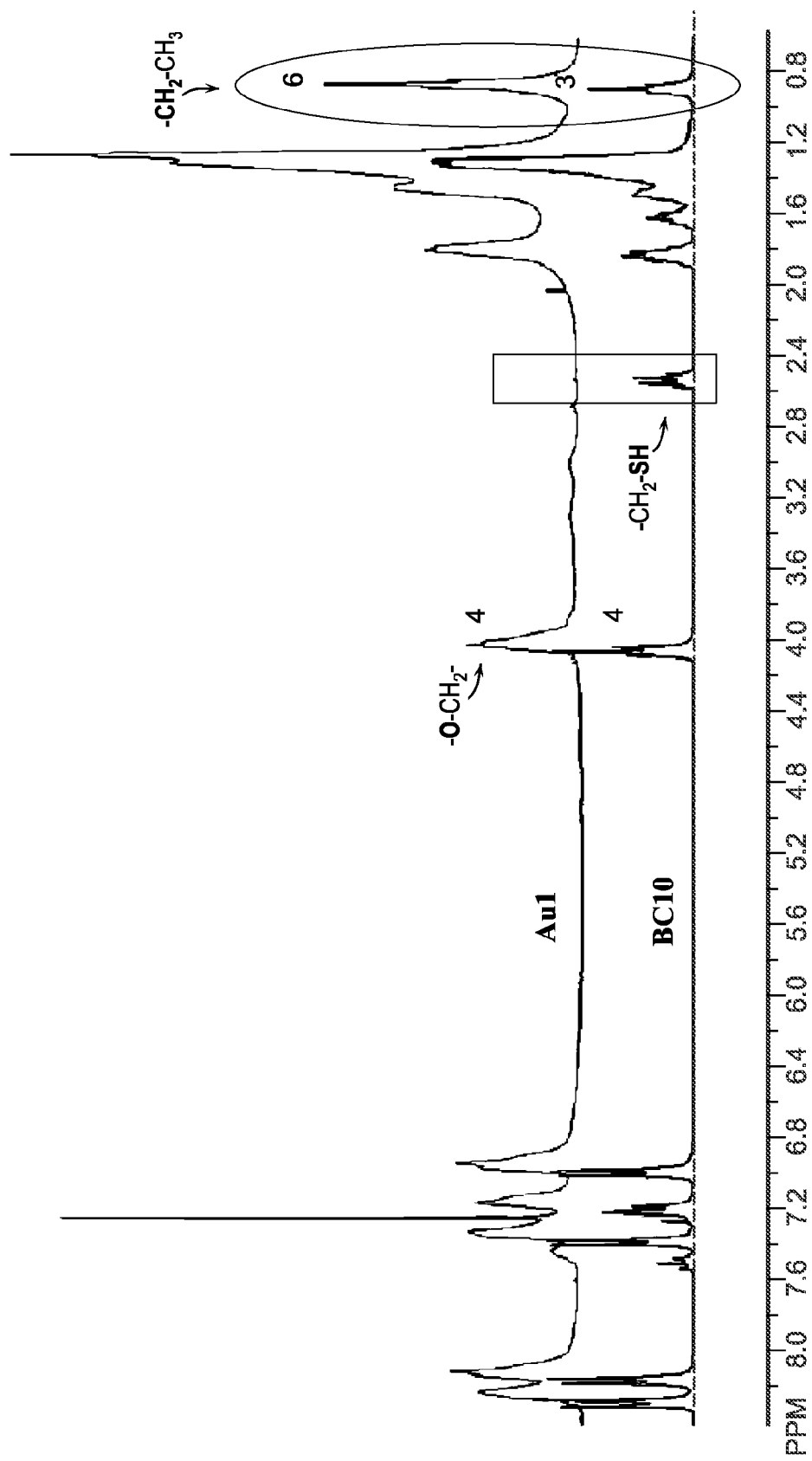
Figure 15B:
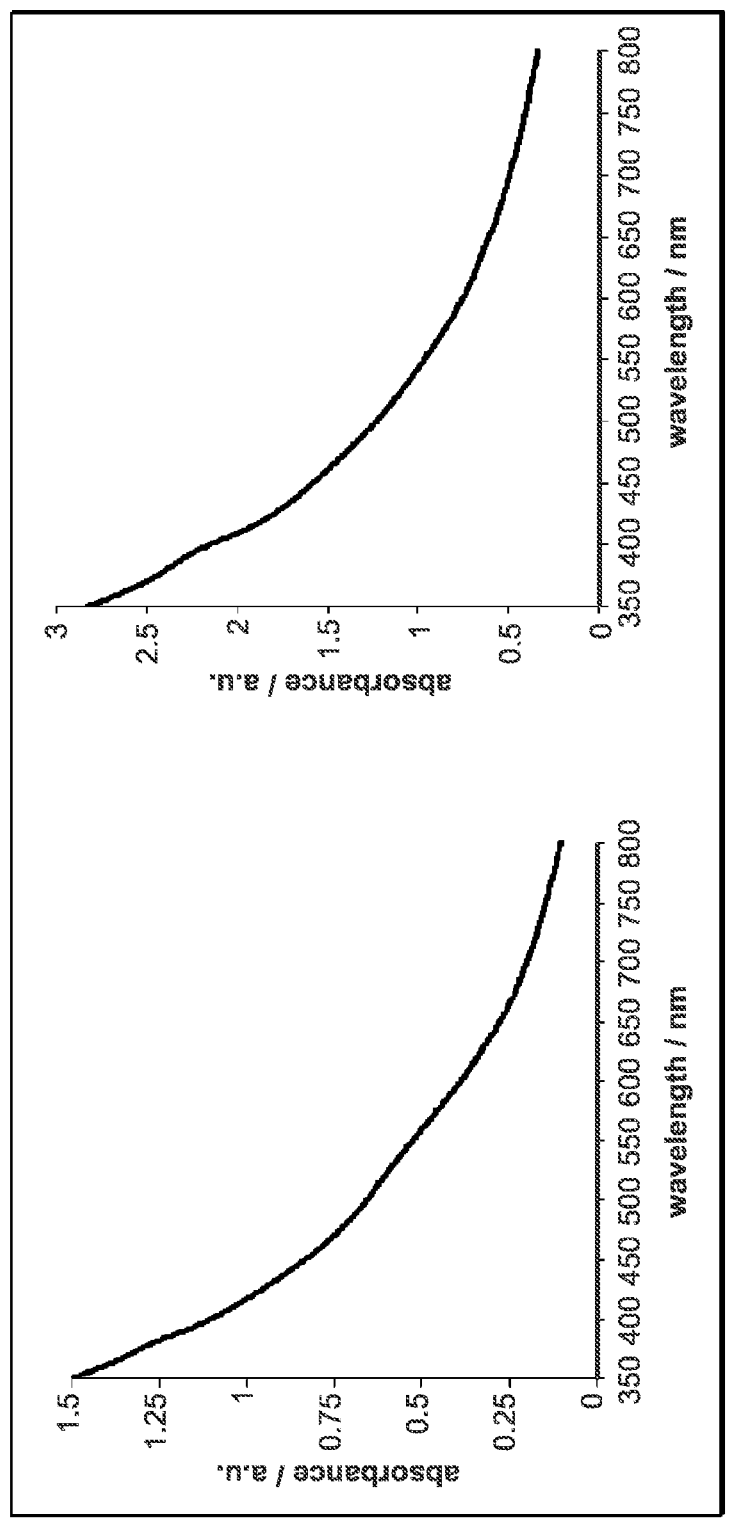
Figure 15C:
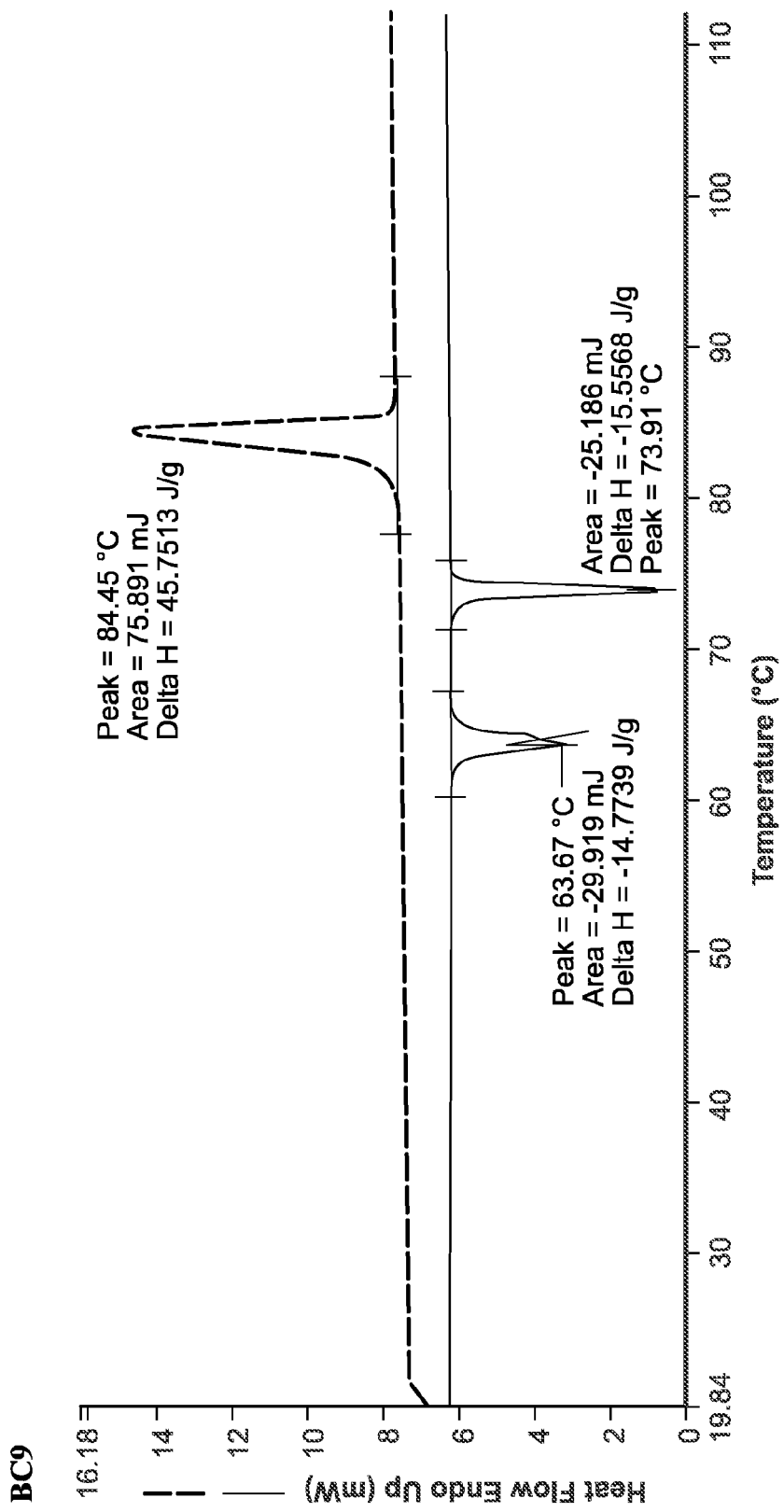
Figure 15C:
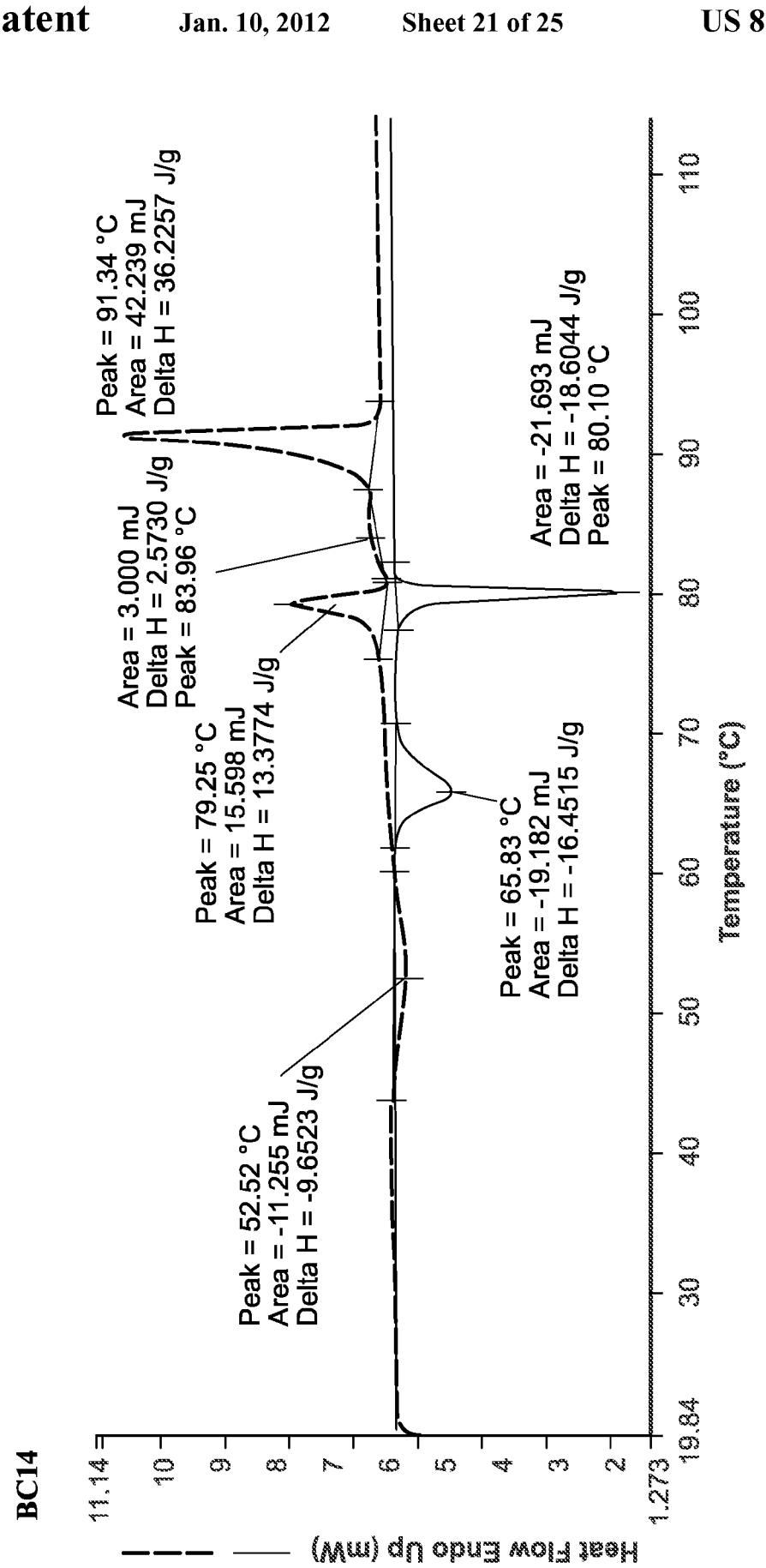
Figure 15D:
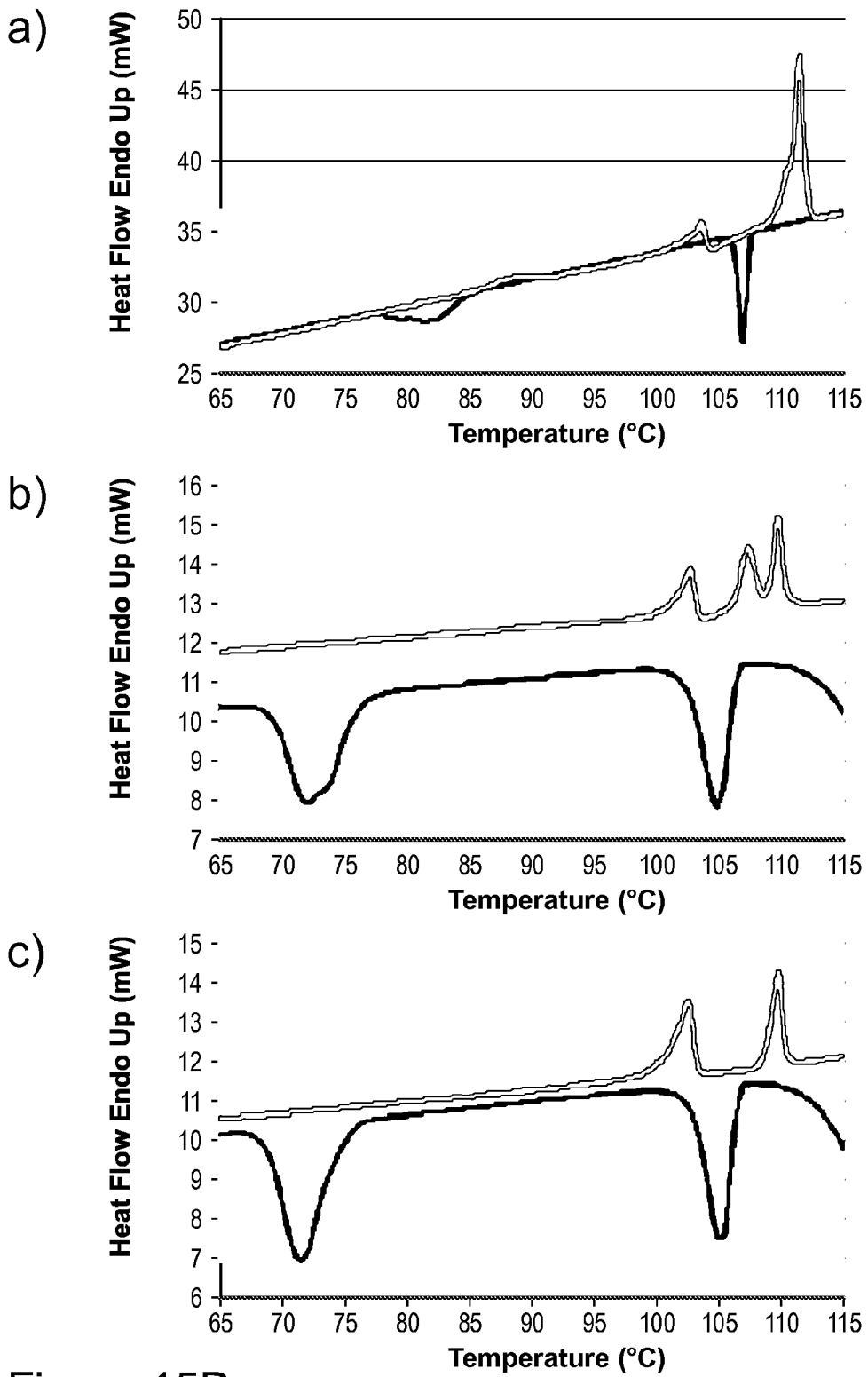
Figure 15D:
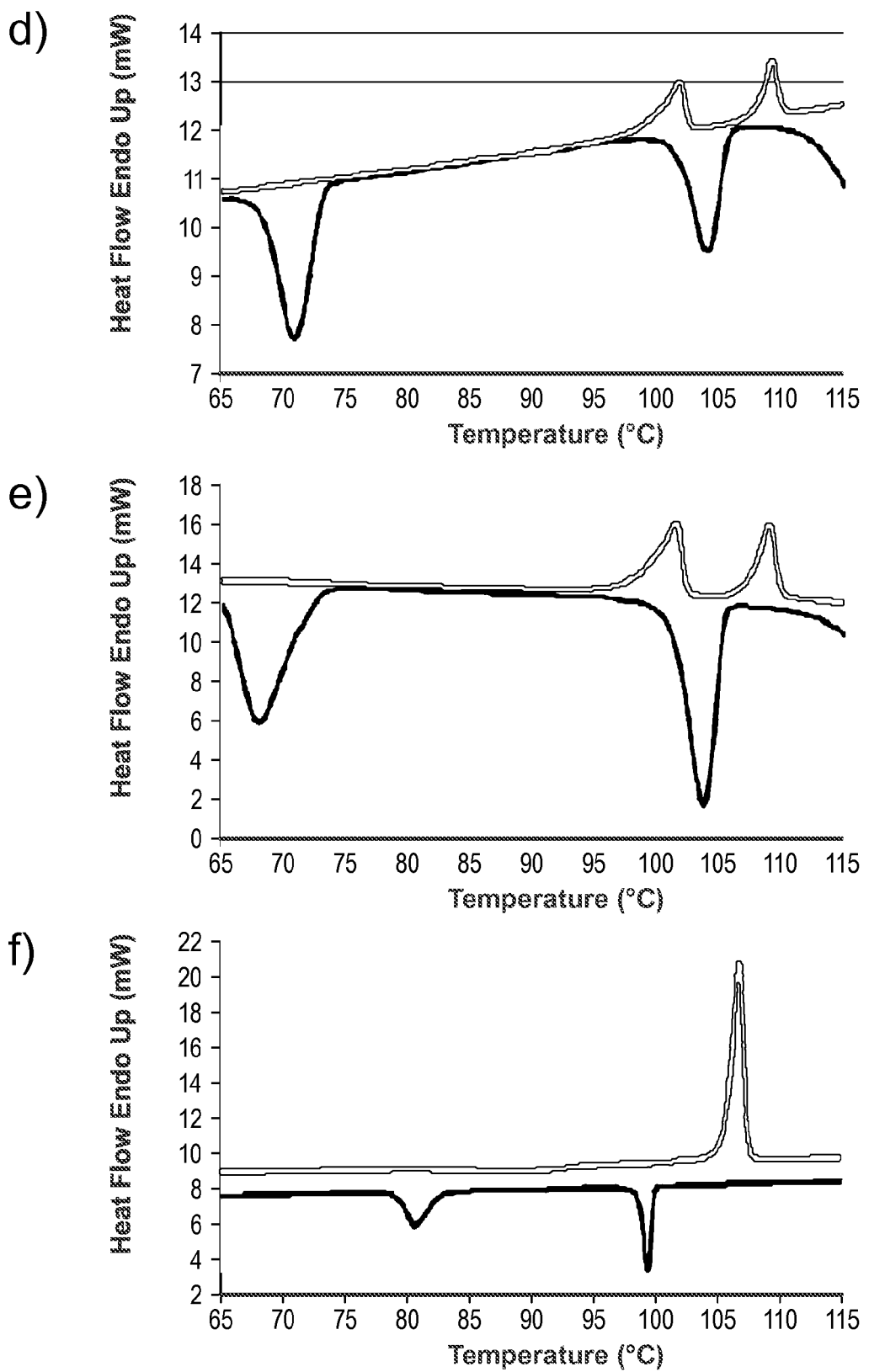
Figure 15D:
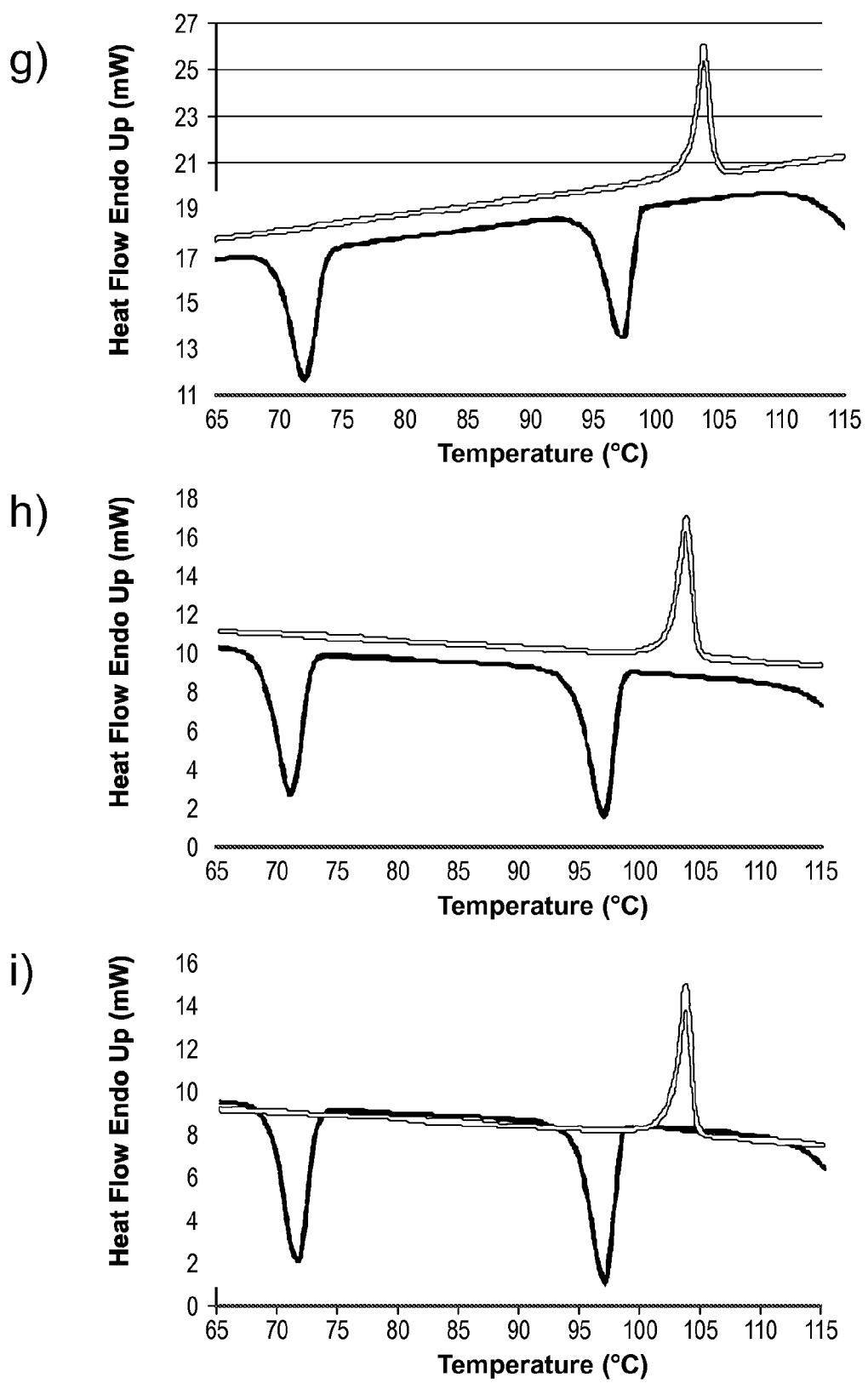
Figure 15D:
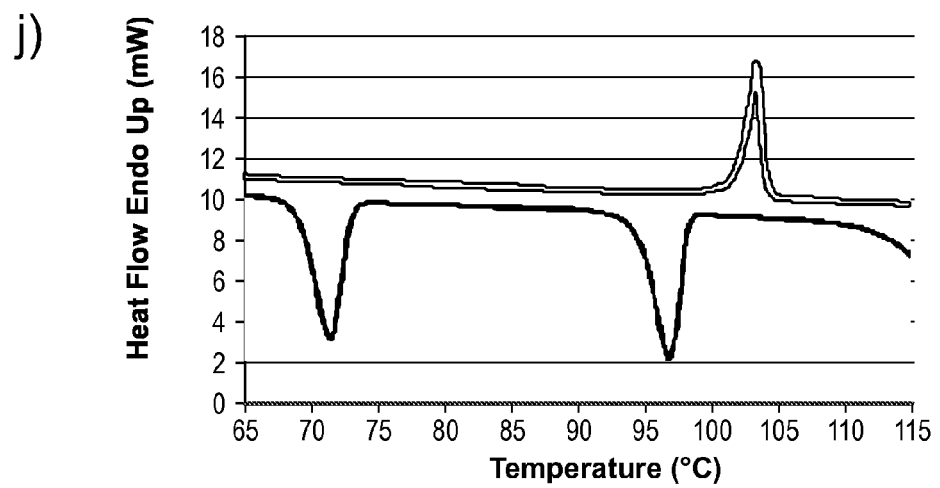

For example, while visual inspection of the thin films of BC1 containing the gold NPs seem to indicate that the nanoclusters are reasonably well dispersed (FIG. 6), polarized optical photomicrographs of mixtures with higher particle content (≧5 wt %) appear to show that the gold NPs begin forming one-dimensional NP-aggregates (assemblies) in the LC host matrix (FIG. 11). FIG. 11 is a polarized optical photomicrograph of the texture formed by 5wt % Au1 in BC1 on cooling at the transition from the isotropic liquid to the SmCP$_A$ phase (100×). One polarizer is rotated about 15° to show the dark line-like aggregates, presumably the result of aggregation of the NPs.

The extent of aggregation already hinted by UV-vis spectrophotometry (FIG. 7) as well as the conductivity (polarizability) of the bent-core decorated mixed monolayer gold NPs become apparent for mixtures containing ≧5wt % gold NPs with electro-optic test cells (cell gap: 5 μm) filled with these mixtures short-circuiting from time to time upon applying an electric field (making detailed testing of these mixtures very difficult and not necessarily reproducible).

DETAILED DESCRIPTION OF EXPERIMENTAL EXAMPLES: SYNTHESIS, SELF-ASSEMBLY AND EFFECTS IN MIXTURES OF BENT-CORE LC GOLD DECORATED NANOCLUSTERS WITH BENT-CORE LC HOSTS

Detailed Synthetic Information

General Considerations. All reagents used were purchased from Sigma Aldrich and used as received. All solvents used were Aldrich Purification grade, purified via a PureSolv solvent purification system (Innovative Technology Inc.), with the exception of t-butanol (Alfa Aesar, 99%) and ethanol (technical grade). All reactions were conducted under N$_2$ atmosphere, unless stated otherwise.

Intermediates 1-25

Methyl 4-(decyloxy)benzoate (1). Anhydrous K$_2$CO$_3$ (18.43 g, 0.13 mol) was added to 300 mL of CH$_3$CN, and the solution was degassed with N$_2$ for 20 minutes. Methyl-4-hydroxybenzoate (6.27 g, 41.2 mmol) was added to the reaction flask, which was heated to 70° C., following which 1-bromodecane (8.8 mL, 42.5 mmol) was added. The above solution was refluxed for 12 hours, and upon cooling the solvent was removed under reduced pressure. The residue was taken in CH$_2$Cl$_2$ (200 mL) and washed with 1 M HCl (100 mL). The organic layer was washed with distilled H$_2$O (100 mL), and the solvent was removed under reduced pressure. Yield 12.0 g (quant.). $^1$H NMR: $\delta_H$ (CDCl$_3$; 300 MHz): 0.90 (3 H, t, $^3$J=6.9 Hz, CH$_3$), 1.24-1.54 (14 H, m, CH$_2$), 1.81 (2 H, m, O—CH$_2$—CH$_2$), 3.90 (3 H, s, OCH$_3$), 4.01 (2 H, t, $^3$J=6.6 Hz, O—CH$_2$), 6.92 (2 H, d, $^3$J=9.0 Hz, Ar—H), 7.99 (2H, d, $^3$J=9.0 Hz, Ar—H). $^{13}$C NMR: $\delta_C$ (CDCl$_3$; 75 MHz): 14.5, 23.0, 26.4, 29.5, 29.7, 29.9, 32.3, 52.2, 68.6, 114.5, 122.7, 131.9, 163.4, 167.3.

Methyl 4-(dodecyloxy)benzoate (2). Synthesized as described above for compound 1. Quantities: K$_2$CO$_3$ (8.63 g, 62 mmol), methyl-4-hydroxy-benzoate (4.75 g, 31 mmol), 1-bromododecane (7.6 mL, 32 mmol). Yield 9.58 g (96%). $^1$H NMR: $\delta_H$ (CDCl$_3$; 300 MHz): 0.88 (3 H, t, $^3$J=6.9 Hz, CH$_3$), 1.21-1.51 (18 H, m, CH$_2$), 1.79 (2 H, m, O—CH$_2$—CH$_2$), 3.88 (3 H, s, OCH$_3$), 4.00 (2 H, t, $^3$J=6.6 Hz, O—CH$_2$), 6.90 (2 H, d, $^3$J=9.0 Hz, Ar—H), 7.98 (2 H, d, $^3$J=9.0 Hz, Ar—H). $^{13}$C NMR: $\delta_C$ (CDCl$_3$; 75 MHz): 14.5, 23.1, 26.4, 29.5, 29.8, 29.9, 30.0, 30.1, 32.3, 52.2, 68.6, 114.5, 122.7, 131.9, 163.4, 167.3.

1.3. Methyl 4-(dec-9-enyloxy)benzoate (3). Synthesized as described above for compound 1. Quantities: K$_2$CO$_3$ (18.2 g, 0.13 mol), methyl-4-hydroxy-benzoate (6.30 g, 41.4 mmol), 10-bromo-1-decene (8.6 mL, 42.8 mmol). Yield 12.0 g (quant.). $^1$H NMR: $\delta_H$ (CDCl$_3$; 300 MHz): 1.23-1.51 (10 H, m, CH$_2$), 1.77 (2 H, m, O—CH$_2$—CH$_2$), 2.03 (2 H, m, CH$_2$=CH—CH$_2$), 3.85 (3 H, s, OCH$_3$), 3.95 (2 H, t, $^3$J=6.5 Hz, O—CH$_2$), 4.95 (2 H, m, CH$_2$=CH), 5.79 (1 H, m, CH$_2$=CH), 6.87 (2 H, d, $^3$J=9.0 Hz, Ar—H), 7.98 (2 H, d, $^3$J=9.0 Hz, Ar—H). $^{13}$C NMR: $\delta_C$ (CDCl$_3$; 75 MHz): 26.0, 28.9, 29.0, 29.1, 29.3, 29.4, 51.7, 68.1, 114.0, 114.2, 122.3, 131.5, 139.0, 162.9, 166.7.

Methyl 4-(undec-10-enyloxy)benzoate (4). Synthesized as described above for compound 1. Quantities: K$_2$CO$_3$ (9.08 g, 66 mmol), methyl-4-hydroxy-benzoate (5.00 g, 33 mmol), 11-bromo-1-undecene (7.6 mL, 34 mmol). Yield 10.1 g (quant). $^1$NMR: $\delta_H$ (CDCl$_3$; 300 MHz): 1.24-1.52 (12 H, m, CH$_2$), 1.80 (2 H, m, O—CH$_2$—CH$_2$), 2.04 (2 H, m, CH$_2$=CH—CH$_2$), 3.87 (3 H, s, OCH$_3$), 4.00 (2 H, t, $^3$J=6.5 Hz, O—CH$_2$), 4.95 (2 H, m, CH$_2$=CH), 5.82 (1 H, m, CH$_2$=CH), 6.90 (2 H, d, $^3$J=9.0 Hz, Ar—H), 7.97 (2 H, d, $^3$J=9.0 Hz, Ar—H). $^{13}$C NMR: $\delta_C$ (CDCl$_3$; 75 MHz): 26.4, 29.3, 29.5, 29.7, 29.8, 29.9, 34.2, 52.2, 68.6, 114.45, 114.5, 122.7, 131.9, 139.6, 163.4, 167.3.

4-(10-Bromodecyloxy)benzaldehyde (5). Synthesized as described above for compound 1. Quantities: K$_2$CO$_3$ (4.75 g, 34 mmol), p-hydroxybenzaldehyde (3.57 g, 29 mmol), 1,10-dibromodecane (8.6 mL, 38 mmol). Yield 10.0 g (quant.). $^1$H NMR: $\delta_H$ (CDCl$_3$; 300 MHz): 1.22-1.52 (12 H, m, CH$_2$), 1.80 (4 H, m, O—CH$_2$—CH$_2$/Br—CH$_2$—CH$_2$), 3.36 (2 H, t, $^3$J=6.9 Hz, Br—CH$_2$), 4.00 (2 H, t, $^3$J=6.5 Hz, O—CH$_2$), 6.95 (2 H, d, $^3$J=8.7 Hz, Ar—H), 7.79 (2 H, d, $^3$J=8.8 Hz, Ar—H), 9.84 (1 H, s, COH). $^{13}$C NMR: $\delta_C$ (CDCl$_3$; 75 MHz): 25.9, 28.1, 28.7, 29.0, 29.3, 29.4, 29.5, 32.8, 34.0, 68.4, 114.7, 129.7, 131.9, 164.2, 190.7.

4-(12-Bromododecyloxy)benzaldehyde (6). Synthesized as described above for compound 1. Quantities: K$_2$CO$_3$ (4.6 g, 33 mmol), p-hydroxybenzaldehye (3.27 g, 27 mmol), 1,10-dibromododecane (11.56 g, 35 mmol). Yield 7.0 g (70%). $^1$H NMR: $\delta_H$ (CDCl$_3$; 300 MHz): 1.24-1.52 (16 H, m, CH$_2$), 1.84 (4 H, m, O—CH$_2$—CH$_2$/Br—CH$_2$—CH$_2$), 3.40 (2 H, t, $^3$J=6.9 Hz, Br—CH$_2$), 4.06 (2 H, t, $^3$J=6.5 Hz, O—CH$_2$), 6.98 (2 H, d, $^3$J=8.7 Hz, Ar—H), 7.82 (2 H, d, $^3$J=8.8 Hz, Ar—H), 9.88 (1 H, s, COH). $^{13}$C NMR: $\delta_C$ (CDCl$_3$; 75 MHz): 26.3, 28.6, 29.1, 29.4, 29.7, 29.8, 29.9, 33.2, 34.4, 68.8, 115.1, 130.1, 132.3, 164.6, 191.1.

4-(10-Bromodecyloxy)benzoic acid (7). Resorcinol (4.16 g, 38 mmol) and 5 (10.0 g, 29 mmol) were dissolved in t-butanol (600 mL) through gentle heating to 70° C. The solution was cooled to room temperature, and a solution of NaH$_2$PO$_4$·H$_2$O (13.7 g, 88 mmol) and NaClO$_2$ (15.3 g, 170 mmol) in deionized H$_2$O (100 mL) was added dropwise to the flask over a period of 10 minutes. The purple-red mixture was stirred overnight, following which it faded to a pale yellow colour. Volatile components were removed, and the residue was taken in hexane (200 mL) and 1 M HCl (200 mL). The white precipitate was filtered and washed profusely with distilled H$_2$O and hexane. Yield 10.5 g (quant.). $^1$H NMR: $\delta_H$ (CDCl$_3$; 300 MHz): 1.26-1.55 (12 H, m, CH$_2$), 1.86 (4 H, m, O—CH$_2$—CH$_2$/Br—CH$_2$—CH$_2$), 3.44 (2 H, t, $^3$J=6.8 Hz, Br—CH$_2$), 4.04 (2 H, t, $^3$J=6.5 Hz, O—CH$_2$), 6.95 (2 H, d, $^3$J=8.9 Hz, Ar—H), 8.07 (2 H, d, $^3$J=8.9 Hz, Ar—H). $^{13}$C NMR: $\delta_C$ (CDCl$_3$; 75 MHz): 26.0, 28.1, 28.7, 29.0, 29.3, 29.4, 32.8, 34.0, 68.3, 114.2, 121.4, 132.3, 163.7, 171.5.

4-(10-(Ethoxycarbonothioylthio)decyloxy)benzoic acid (8). Compound 7 (2.49 g, 7 mmol) was dissolved in 600 mL of acetone that had been dried overnight over activated molecular sieves (4 Å), potassium o-ethyl xanthogenate (3.53 g, 22 mmol) was added to the flask, and the mixture was let to stir for 3 days in the dark at 4° C. The solvent was evaporated, and the residue was taken in CH$_2$Cl$_2$ (300 mL) and washed with 1 M HCl (50 mL). The product was then selectively precipitated from dichloromethane through dropwise addition of petroleum ether. Yield 2.79 g (quant.). $^1$H NMR: $\delta_H$ (CDCl$_3$; 300 MHz): 1.24-1.52 (15 H, m, CH$_2$/O—CH$_2$—CH$_3$), 1.69 (2 H, m, S—CH$_2$—CH$_2$), 1.81 (2 H, m, O—CH$_2$—CH$_2$), 3.11 (2 H, t, $^3$J=7.3 Hz, SCH$_2$), 4.02 (2 H, t, $^3$J=6.5 Hz, O—CH$_2$), 4.65 (2 H, q, $^3$J=7.1 Hz, O—CH$_2$—CH$_3$), 6.93 (2 H, d, $^3$J=8.8 Hz, Ar—H), 8.04 (2 H, d, $^3$J=8.7 Hz, Ar—H).

4-(12-Bromododecyloxy)benzoic acid (9). Synthesized as described above for compound 7. Quantities: resorcinol (2.69 g, 24 mmol), 6 (7.0 g, 19 mmol), NaH$_2$PO$_4$·H$_2$O (8.87 g, 57 mmol), NaClO$_2$ (9.92 g, 110 mmol). Yield 7.32 g (quant.). $^1$H NMR: $\delta_H$ (CDCl$_3$; 300 MHz): 1.24-1.52 (16 H, m, CH$_2$), 1.84 (4 H, m, O—CH$_2$—CH$_2$/Br—CH$_2$—CH$_2$), 3.40 (2 H, t, $^3$J=6.9 Hz, Br—CH$_2$), 4.06 (2 H, t, $^3$J=6.5 Hz, O—CH$_2$), 6.93 (2 H, d, $^3$J=9.0 Hz, Ar—H), 8.04 (2 H, d, $^3$J=8.9 Hz, Ar—H). $^{13}$C NMR: $\delta_C$ (CDCl$_3$; 75 MHz): 26.0, 28.2, 28.7, 29.1, 29.3, 29.4, 29.5, 32.8, 34.0, 68.3, 114.2, 121.3, 132.3, 163.7, 171.4.

4-Formylphenyl 4-(decyloxy)benzoate (10). KOH (3.78 g, 67.6 mmol) was added to a solution of 1 (12.0 g, 41.0 mmol) dissolved in 250 mL of hot EtOH, and the mixture was refluxed for 24 hours. The solvent was filtered off, and following drying over P$_2$O$_5$ the white solid was suspended in 300 mL of toluene, and refluxed with oxalyl chloride (13.4 mL, 158.54) for 6 hours. Volatile components were removed, the yellow solid was taken in CH$_2$Cl$_2$ (100 mL), and added to a stirred solution containing p-hydroxybenzaldehyde (5.26 g, 43.1), triethylamine (36 mL, 0.261 mol), and DMAP (0.28 g, 2.3 mmol) in CH$_2$Cl$_2$ (100 mL). The mixture was let to stir at room temperature for three hours, and then heated to reflux for twelve hours. Following cooling to room temperature, the organic layer was washed with 1 M HCl (2×100 mL), and then distilled water (100 mL). The solvent was removed, and the product was obtained as an off-white solid following recrystallization from ethanol. Yield (8.5 g, 54%). $^1$H NMR: $\delta_H$ (CDCl$_3$; 300 MHz): 0.91 (3 H, t, $^3$J=6.8 Hz, CH$_3$), 1.21-1.58 (14 H, m, CH$_2$), 1.85 (2 H, m, O—CH$_2$—CH$_2$), 4.07 (2 H, t, $^3$J=6.5 Hz, O—CH$_2$), 7.00 (2 H, d, $^3$J=9.0 Hz, Ar—H), 7.42 (2 H, d, $^3$J=8.5 Hz, Ar—H), 7.98 (2 H, d, $^3$J=8.6 Hz, Ar—H), 8.16 (2 H, d, $^3$J=9.0 Hz, Ar—H), 10.03 (1 H, s, COH). $^{13}$C NMR: $\delta_C$ (CDCl$_3$; 75 MHz): 14.5, 23.1, 26.4, 29.5, 29.7, 29.8, 30.0, 32.3, 68.8, 114.8, 121.2, 123.0, 131.6, 132.8, 134.3, 156.3, 164.3, 164.6, 191.4.

4-Formylphenyl 4-(dodecyloxy)benzoate (11). Synthesized as described above for compound 10. Quantities: 2 (9.58 g, 30 mmol), KOH (2.34 g, 42 mmol), oxalyl chloride (12 mL, 140 mmol), p-hydroxybenzaldehyde (4.38 g, 36 mmol), triethylamine (32 mL, 0.23 mol), DMAP (0.19 g, 1.6 mmol). Yield 11.6 g (97%). $^1$H NMR: $\delta_H$ (CDCl$_3$; 300 MHz): 0.89 (3 H, t, $^3$J=6.9 Hz, CH$_3$), 1.21-1.51 (18 H, m, CH$_2$), 1.83 (2 H, m, O—CH$_2$—CH$_2$), 4.05 (2 H, t, $^3$J=6.6 Hz, O—CH$_2$), 6.99 (2 H, d, $^3$J=9.0 Hz, Ar—H), 7.40 (2 H, d, $^3$J=8.5 Hz, Ar—H), 7.97 (2 H, d, $^3$J=8.6 Hz, Ar—H), 8.16 (2 H, d, $^3$J=9.0 Hz, Ar—H), 10.0 (1 H, s, COH). $^{13}$C NMR: $\delta_C$ (CDCl$_3$; 75 MHz): 14.5, 23.1, 26.4, 29.5, 29.6, 29.7, 32.2, 68.8, 114.8, 121.2, 123.0, 131.6, 132.8, 134.3, 156.3, 164.3, 164.6, 191.4.

4-Formylphenyl 4-(dec-9-enyloxy)benzoate (12). Synthesized as described above for compound 10. Quantities: 3 (12.0 g, 41.3 mmol), KOH (3.62 g, 64.7 mmol), oxalyl chloride (12 mL, 0.15 mol), p-hydroxybenzaldehyde (5.25 g, 43.0 mmol), triethylamine (35 mL, 0.25 mol), DMAP (0.25 g, 2.0 mmol). Yield 5.6 g (36%). $^1$H NMR: $\delta_H$ (CDCl$_3$; 300 MHz): 1.27-1.57 (10 H, m, CH$_2$), 1.85 (2 H, m, O—CH$_2$—CH$_2$), 2.07 (2 H, m, CH$_2$=CH—CH$_2$), 4.07 (2 H, t, $^3$J=6.6 Hz, O—CH$_2$), 4.99 (2 H, m, CH$_2$=CH), 5.84 (1 H, m, CH$_2$=CH), 7.00 (2 H, d, $^3$J=9.0 Hz, Ar—H), 7.42 (2 H, d, $^3J$=8.5 Hz, Ar—H), 7.98 (2 H, d, $^3J$=8.6 Hz, Ar—H), 8.16 (2 H, d, $^3J$=9.0 Hz, Ar—H), 10.03 (1 H, s, COH). $^{13}$C NMR: $\delta_C$ (CDCl$_3$; 75 MHz): 26.4, 29.3, 29.4, 29.5, 29.7, 29.8, 34.2, 68.8, 114.6, 114.8, 121.2, 123.0, 131.6, 132.8, 134.3, 139.5, 156.3, 164.3, 164.6, 191.4.

4-Formylphenyl 4-(undec-10-enyloxy)benzoate (13). Synthesized as described above for compound 10. Quantities: 4 (10.10 g, 33 mmol), KOH (2.46, 45 mmol), oxalyl chloride (13 mL, 148 mmol), p-hydroxybenzaldehyde (4.6 g, 38 mmol), triethylamine (33.7 mL, 0.24 mol), DMAP (0.20 g, 1.6 mmol). Yield 8.9 g (71%). $^1$HNMR: $\delta_H$ (CDCl$_3$; 300 MHz): 1.24-1.52 (12 H, m, CH$_2$), 1.83 (2 H, m, O—CH$_2$—CH$_2$), 2.04 (2 H, m, CH$_2$=CH—CH$_2$), 4.05 (2 H, t, $^3J$=6.5 Hz, O—CH$_2$), 4.95 (2 H, m, CH$_2$=CH), 5.82 (1 H, m, CH$_2$=CH), 6.99 (2 H, d, $^3J$=9.0 Hz, Ar—H), 7.40 (2 H, d, $^3J$=8.5 Hz, Ar—H), 7.96 (2 H, d, $^3J$=8.6 Hz, Ar—H), 8.14 (2 H, d, $^3J$=9.0 Hz, Ar—H), 10.0 (1 H, s, COH). $^{13}$C NMR: $\delta_C$ (CDCl$_3$; 75 MHz): 26.4, 29.3, 29.5, 29.5, 29.7, 29.8, 29.9, 34.2, 68.8, 114.6, 114.8, 121.2, 123.0, 131.6, 132.8, 134.3, 139.6, 156.3, 164.3, 164.6, 191.4.

4-Formylphenyl 4-(10-(ethoxycarbonothioylthio)decyloxy)benzoate (14). p-Hydroxybenzaldehyde (0.37 g, 3.0 mmol), 8 (1.2 g, 3.0 mmol), and DMAP (0.04 g, 0.3 mmol) were dissolved in 300 mL of CH$_2$Cl$_2$. DCC (1.24 g, 6.0 mmol) was added to reaction flask which was stirred at room temperature for three days. The solvent was removed under reduced pressure, and the residue purified using column chromatography (CH$_2$Cl$_2$:EtOH, 10:0.05). The product was then recrystallized from ethanol. Yield 0.3 g (20%). $^1$HNMR: $\delta_H$ (CDCl$_3$; 300 MHz): 1.24-1.52 (15 H, m, CH$_2$/O—CH$_2$—CH$_3$), 1.69 (2 H, m, S—CH$_2$—CH$_2$), 1.81 (2 H, m, O—CH$_2$—CH$_2$), 3.11 (2 H, t, $^3J$=7.3 Hz, SCH$_2$), 4.02 (2 H, t, $^3J$=6.5 Hz, O—CH$_2$), 4.65 (2 H, q, $^3J$=7.1 Hz, O—CH$_2$—CH$_3$), 6.99 (2 H, d, $^3J$=8.9 Hz, Ar—H), 7.40 (2 H, d, $^3J$=8.5 Hz, Ar—H), 7.96 (2 H, d, $^3J$=8.6 Hz, Ar—H), 8.14 (2 H, d, $^3J$=8.9 Hz, Ar—H), 10.0 (1 H, s, COH). $^{13}$C NMR: $\delta_C$ (CDCl$_3$; 75 MHz): 13.8, 25.9, 28.1, 28.3, 28.8, 29.1, 29.3, 29.4, 35.9, 68.4, 69.7, 114.4, 120.8, 122.6, 131.2, 132.4, 133.9, 155.9.

4-Formylphenyl-4-(12-bromododecyloxy)benzoate (15). Synthesized as described for the preparation of compound 14. Quantities: p-hydroxybenzaldehyde (1.78 g, 15 mmol), 9 (5.5 g, 14 mmol), DMAP (0.25 g, 2.0 mmol), DCC (6.54 g, 32 mmol). Yield 5.2 g (79%). $^1$H NMR: $\delta_H$ (CDCl$_3$; 300 MHz): 1.24-1.52 (12 H, m, CH$_2$), 1.84 (4 H, m, O—CH$_2$—CH$_2$/Br—CH$_2$—CH$_2$), 3.40 (2 H, t, $^3J$=6.9 Hz, Br—CH$_2$), 4.06 (2 H, d, $^3J$=6.5 Hz, O—CH$_2$), 6.99 (2 H, d, $^3J$=8.9 Hz, Ar—H), 7.40 (2 H, d, $^3J$=8.5 Hz, Ar—H), 7.97 (2 H, d, $^3J$=8.6 Hz, Ar—H), 8.14 (2 H, d, $^3J$=8.9 Hz, Ar—H), 10.00 (1 H, s, COH). $^{13}$C NMR: $\delta_C$ (CDCl$_3$; 75 MHz): 13.8, 25.9, 28.1, 28.3, 28.8, 29.1, 29.3, 29.3, 29.4, 35.9, 68.4, 69.7, 114.4, 120.8, 122.6, 131.2, 132.4, 133.9, 155.9.

4-(4-(Decyloxy)benzoyloxy)benzoic acid (16). Synthesized as described above for compound 7. Quantities: resorcinol (3.18 g, 28.9 mmol), 10 (8.5 g, 22 mmol), NaH$_2$PO$_4$·H$_2$O (10.39 g, 66.6 mmol), NaClO$_2$ (11.65 g, 0.13 mol). Yield 8.8 g (quant.). $^1$H NMR: $\delta_H$ (CDCl$_3$; 300 MHz): 0.91 (3 H, t, $^3J$=6.8 Hz, CH$_3$), 1.23-1.59 (14 H, m, CH$_2$), 1.85 (2 H, m, O—CH$_2$—CH$_2$), 4.07 (2 H, t, $^3J$=6.5 Hz, O—CH$_2$), 7.00 (2 H, d, $^3J$=8.9 Hz, Ar—H), 7.36 (2 H, d, $^3J$=8.6 Hz, Ar—H), 8.17 (2 H, d, $^3J$=8.9 Hz, Ar—H), 8.22 (2 H, d, $^3J$=8.6 Hz, Ar—H). $^{13}$C NMR: $\delta_C$ (CDCl$_3$; 75 MHz): 14.5, 23.1, 26.4, 29.5, 29.7, 29.8, 30.0, 32.3, 68.8, 114.8, 121.4, 122.4, 127.0, 132.3, 132.8, 156.0, 164.2, 164.7, 171.7.

4-(4-(Dodecyloxy)benzoyloxy)benzoic acid (17). Synthesized as described above for compound 7. Quantities: resorcinol (1.79 g, 16 mmol), 11 (5.52 g, 13 mmol), NaH$_2$PO$_4$·H$_2$O (6.29 g, 40 mmol), NaClO$_2$ (7.03 g, 77 mmol). Yield 5.55 g (quant.). $^1$H NMR: $\delta_H$ (CDCl$_3$; 300 MHz): 0.89 (3 H, t, $^3J$=6.9 Hz, CH$_3$), 1.17-1.71 (18 H, m, CH$_2$), 1.83 (2 H, m, O—CH$_2$—CH$_2$), 4.05 (2 H, t, $^3J$=6.6 Hz, O—CH$_2$), 6.99 (2 H, d, $^3J$=8.9 Hz, Ar—H), 7.35 (2 H, d, $^3J$=8.6 Hz, Ar—H), 7.98 (2 H, d, $^3J$=8.6 Hz, Ar—H), 8.14 (2 H, d, $^3J$=8.9 Hz, Ar—H), 8.17 (2 H, d, $^3J$=8.6 Hz, Ar—H). $^{13}$C NMR: $\delta_C$ (CDCl$_3$; 300 MHz): 14.1, 22.7, 26.0, 29.1, 29.3, 29.5, 29.6, 29.7, 31.9, 68.4, 114.4, 120.9, 122.0, 126.5, 131.9, 132.4, 155.5, 170.3.

4-(4-(Dec-9-enyloxy)benzoyloxy)benzoic acid (18). Synthesized as described above for compound 7. Quantities: resorcinol (2.11 g, 19.1 mmol), 12 (5.6 g, 14.7 mmol), NaH$_2$PO$_4$·H$_2$O (6.89 g, 44.2 mmol), NaClO$_2$ (7.72 g, 85.4 mmol). Yield 5.8 g (quant). $^1$H NMR: $\delta_H$ (CDCl$_3$; 300 MHz): 1.27-1.57 (10 H, m, CH$_2$), 1.85 (2 H, m, O—CH$_2$—CH$_2$), 2.08 (2 H, m, CH$_2$=CH—CH$_2$), 4.07 (2 H, t, $^3J$=6.6 Hz, O—CH$_2$), 4.99 (2 H, m, CH$_2$=CH), 5.84 (1 H, m, CH$_2$=CH), 7.00 (2 H, d, $^3J$=8.9 Hz, Ar—H), 7.36 (2 H, d, $^3J$=8.6 Hz, Ar—H), 8.17 (2 H, d, $^3J$=8.9 Hz, Ar—H), 8.22 (2 H, d, $^3J$=8.6 Hz, Ar—H). $^{13}$C NMR: $\delta_C$ (CDCl$_3$; 75 MHz): 26.4, 29.3, 29.4, 29.5, 29.7, 29.8, 34.2, 68.7, 114.6, 114.8, 121.34, 122.4, 127.0, 132.8, 139.5, 156.0, 164.2, 164.7, 171.7.

4-(4-(Undec-10-enyloxy)benzoyloxy)benzoic acid (19). Synthesized as described above for compound 7. Quantities: resorcinol (1.71 g, 16 mmol), 13 (5.07 g, 13 mmol), NaH$_2$PO$_4$·H$_2$O (5.32 g, 39 mmol), NaClO$_2$ (6.71 g, 74 mmol). Yield 5.34 g (quant.). $^1$H NMR: $\delta_H$ (CDCl$_3$; 300 MHz): 1.24-1.52 (12 H, m, CH$_2$), 1.83 (2 H, m, O—CH$_2$—CH$_2$), 2.04 (2 H, m, CH$_2$=CH—CH$_2$), 4.05 (2 H, t, $^3J$=6.5 Hz, O—CH$_2$), 4.95 (2 H, m, CH$_2$=CH), 5.82 (1 H, m, CH$_2$=CH), 6.99 (2 H, d, $^3J$=8.9 Hz, Ar—H), 7.34 (2 H, d, $^3J$=8.6 Hz, Ar—H), 8.16 (2 H, d, $^3J$=8.9 Hz, Ar—H), 8.20 (2 H, d, $^3J$=8.6 Hz, Ar—H). $^{13}$C NMR: $\delta_C$ (CDCl$_3$; 75 MHz): 26.0, 28.9, 29.1, 29.3, 29.4, 29.5, 33.8, 68.4, 114.1, 114.4, 121.0, 122.0, 126.5, 131.9, 132.4, 139.2, 155.5, 163.8, 170.6.

4-(4-(10-(Ethoxycarbonothioylthio)decyloxy)benzoyloxy)benzoic acid (20). Synthesized as described above for compound 7. Quantities: resorcinol (0.09 g, 0.78 mmol), 14 (0.30 g, 0.6 mmol), NaH$_2$PO$_4$·H$_2$O (0.28 g, 1.8 mmol), NaClO$_2$ (0.31 g, 3.5 mmol). Yield 0.31 g (quant.). $^1$H NMR: $\delta_H$ (CD$_3$OD; 300 MHz): 1.24-1.73 (15 H, m, CH$_2$/O—CH$_2$—CH$_3$), 1.83 (4 H, m, S—CH$_2$—CH$_2$/O—CH$_2$—CH$_2$), 2.80 (2 H, d, $^3J$=7.3 Hz, SCH$_2$), 4.11 (2 H, d, $^3J$=6.2 Hz, OCH$_2$), 4.85 (overlapping with solvent, O—CH$_2$—CH$_3$), 7.08 (2 H, d, $^3J$=8.9 Hz, Ar—H), 7.35 (2 H, d, $^3J$=8.5 Hz, Ar—H), 8.13 (4H, m, Ar—H).

4-(4-(12-Bromododecyloxy))benzoyloxy)benzoic acid (21). Synthesized as described above for compound 7. Quantities: resorcinol (0.73 g, 6.6 mmol), 15 (2.50 g, 5.1 mmol), NaH$_2$PO$_4$·H$_2$O (2.39 g, 15 mmol), NaClO$_2$ (2.67 g, 30 mmol). Yield 2.58 g (quant.). $^1$H NMR: $\delta_H$ (CDCl$_3$; 300 MHz): 1.24-1.52 (16 H, m, CH$_2$), 1.84 (4 H, m, O—CH$_2$—CH$_2$/Br—CH$_2$—CH$_2$), 3.40 (2 H, d, $^3J$=6.9 Hz, Br—CH$_2$), 4.06 (2 H, t, $^3J$=6.5 Hz, O—CH$_2$), 6.99 (2 H, d, $^3J$=8.9 Hz, Ar—H), 7.30 (2 H, d, $^3J$=8.6 Hz, Ar—H), 8.16 (2 H, d, $^3J$=8.9 Hz, Ar—H), 8.20 (2 H, d, $^3J$=8.6 Hz, Ar—H). $^{13}$C NMR: $\delta_C$ (CDCl$_3$; 75 MHz): 26.0, 28.2, 28.7, 29.1, 29.3, 29.4, 29.5, 30.9, 32.8, 34.0, 68.4, 114.4, 121.0, 122.0, 126.6, 131.8, 132.4, 155.4, 163.8, 164.3, 169.8.

4-(4-(12-(Ethoxycarbonothioylthio)dodecyloxy)benzoyloxy)benzoic acid (22). Synthesized as described above for compound 8. Quantities: potassium o-ethyl xanthogenate (5.0 g, 31.2 mmol), 21 (0.30 g, 0.6 mmol). Yield 0.3 g (quant.). $^1$H NMR: $\delta_H$ (CDCl$_3$; 300 MHz): 1.23-1.57 (15 H, m, CH$_2$/O—CH$_2$—CH$_3$), 1.71 (2 H, m, S—CH$_2$—CH$_2$), 1.85 (2 H, m, O—CH$_2$—CH$_2$), 3.14 (2 H, t, $^3J$=7.5 Hz, SCH$_2$), 4.07 (2 H, t, $^3J$=6.2 Hz, OCH$_2$), 4.67 (2 H, q, $^3J$=7.1 Hz, O—CH$_2$—CH$_3$), 7.00 (2 H, d, $^3J$=8.8 Hz, Ar—H), 7.36 (2 H, d, $^3J$=8.6 Hz, Ar—H), 8.16 (2 H, d, $^3J$=8.8 Hz, Ar—H), 8.22 (2 H, d, $^3J$=8.6 Hz, Ar—H). $^{13}$C NMR: $\delta_C$ (CDCl$_3$; 75 MHz): 14.2, 26.4, 28.8, 29.3, 29.5, 29.75, 29.85, 29.9, 30.0, 36.3, 68.8, 70.1, 114.8, 121.4, 122.4, 127.0, 132.3, 132.8, 156.0, 164.2, 164.7, 171.7.

4-((3-Hydroxyphenoxy)carbonyl)phenyl 4-(decyloxy)benzoate (23). Compound 16 (2.05 g, 5.2 mmol) was suspended in toluene (100 mL), and refluxed with oxalyl chloride (2.0 mL, 23.2 mmol) for five hours. Volatile components were removed, and the white solid was taken in $CH_2Cl_2$ (50 mL) and added dropwise while stirring to a solution containing resorcinol (1.23 g, 11.2 mmol), triethylamine (5.4 mL, 39 mmol), and DMAP (0.06 g, 0.52 mmol). Following stirring at room temperature for 12 hours, the mixture was then refluxed for twenty four hours. The solvent was removed under reduced pressure, and the residue purified by column chromatography ($CH_2Cl_2$:EtOH, 10:0.03, and then $CH_2Cl_2$:EtOH, 10:0.3). The product was then recrystallized from ethanol. Yield (1.6 g, 64%). $^1$H NMR: $\delta_H$ (CDCl$_3$; 300 MHz): 0.92 (3 H, t, $^3J$=6.9 Hz, CH$_3$), 1.23-1.60 (14 H, m, CH$_2$), 1.86 (2 H, m, O—CH$_2$—CH$_2$—), 4.07 (2 H, t, $^3J$=6.5 Hz, O—CH$_2$), 6.15 (1 H, bs, OH), 6.69 (2 H, m, Ar—H), 6.78 (1 H, d, $^3J$=8.3 Hz, Ar—H), 7.01 (2 H, d, $^3J$=8.9 Hz, Ar—H), 7.25 (1 H, t, $^3J$=8.5 Hz, Ar—H), 7.38 (2 H, d, 3J=8.8 Hz, Ar—H), 8.18 (2 H, d, $^3J$=8.9 Hz, Ar—H), 8.27 (2 H, d, $^3J$=8.8 Hz, Ar—H). $^{13}$C NMR: $\delta_C$ (CDCl$_3$; 75 MHz): 14.5, 23.1, 26.4, 29.5, 29.7, 29.8, 30.0, 32.3, 68.8, 109.8, 113.8, 113.9, 114.9, 121.2, 122.6, 127.2, 130.5, 132.3, 132.9, 152.0, 155.8, 157.4, 164.3, 165.0, 165.3.

4-((3-Hydroxyphenoxy)carbonyl)phenyl 4-(dodecyloxy) benzoatebenzoate (24). Synthesized as described for the preparation of compound 23. Quantities: 21 (2.9 g, 7 mmol), oxalyl chloride (2.3 mL, 27.6 mmol), resorcinol (2.3 g, 2.1 mol), triethylamine (7.4 mL, 53 mmol), DMAP (0.09 g, 0.7 mmol). Yield 1.37 g (38%). $^1$H NMR: $\delta_H$ (CDCl$_3$; 300 MHz): 0.91 (3 H, t, $^3J$=6.9 Hz, CH$_3$), 1.23-1.56 (18 H, m, CH$_2$), 1.85 (2 H, m, O—CH$_2$—CH$_2$), 4.08 (2 H, t, $^3J$=6.6 Hz, O—CH$_2$), 4.98 (1 H, bs, OH), 6.76 (2 H, m, Ar—H), 6.83 (1 H, d, $^3J$=8.3 Hz, Ar—H), 7.01 (2 H, d, $^3J$=9.0 Hz, Ar—H), 7.30 (1 H, t, $^3J$=8.5 Hz, Ar—H), 7.39 (2 H, d, $^3J$=8.8 Hz, Ar—H), 8.18 (2 H, d, $^3J$=8.9 Hz, Ar—H), 8.29 (2 H, d, $^3J$=8.8 Hz, Ar—H). $^{13}$C NMR: $\delta_C$ (CDCl$_3$; 75 MHz): 14.1, 22.7, 26.0, 29.1, 29.3, 29.55, 29.6, 29.65, 31.9, 53.4, 68.4, 109.3, 113.1, 114.0, 114.4, 120.9, 122.1, 126.8, 131.8, 132.4, 151.8, 155.4, 156.5, 163.8, 164.4.

4-((3-Hydroxyphenoxy)carbonyl)phenyl 4-(12-bromododecyloxy)benzoate (25). Synthesized as described for the preparation of compound 23. Quantities: 21 (1.5 g, 3 mmol), oxalyl chloride (1.6 mL, 18.9 mmol), resorcinol (0.66 g, 6 mol), triethylamine (3 mL, 23 mmol), DMAP (0.04 g, 0.3 mmol). Yield 0.7 g (36%). $^1$H NMR: $\delta_H$ (CDCl$_3$; 300 MHz): 1.27-1.58 (16 H, m, CH$_2$), 1.86 (4 H, m, O—CH$_2$—CH$_2$, Br—CH$_2$—$_{CH2}$), 3.43 (2 H, t, $^3J$=6.8 Hz, Br—CH$_2$), 4.07 (2 H, t, $^3J$=6.5 Hz, O—CH$_2$), 6.70 (2 H, m, Ar—H), 6.77 (1 H, d, $^3J$=8.1 Hz, Ar—H), 7.00 (2 H, d, $^3J$=8.8 Hz, Ar—H), 7.25 (1 H, t, $^3J$=8.5 Hz, Ar—H), 7.37 (2 H, d, $^3J$=8.7 Hz, Ar—H), 8.17 (2 H, d, $^3J$=8.8 Hz, Ar—H), 8.27 (2 H, d, $^3J$=8.7 Hz, Ar—H). $^{13}$C NMR: $\delta_C$ (CDCl$_3$; 75 MHz): 26.4, 28.6, 29.2, 29.5, 29.8, 29.8, 29.9, 33.2, 34.5, 68.8, 109.7, 113.8, 113.9, 114.9, 121.2, 122.5, 127.2, 130.5, 132.3, 132.9, 152.0, 155.8, 157.5, 164.3, 165.0, 165.2.

Bent-Core Derivatives BC1-BC16

1,3-Phenylene bis(4-(4-(decyloxy)benzoyloxy)benzoate) (BC1). Resorcinol (0.3 g, 2.5 mmol), 14 (1.89 g, 4.7 mmol), and DMAP (0.6 g, 5.1 mmol) were dissolved in 50 mL of $CH_2Cl_2$. DCC (2.07 g, 10.0 mmol) was added to reaction flask which was stirred at room temperature for 48 hours. The solvent was removed under reduced pressure, and the residue purified using column chromatography ($CH_2Cl_2$:EtOH, 10:0.03). The product was then selectively precipitated from $CH_2Cl_2$ through dropwise addition of petroleum ether. Yield 1.5 g (68%). EA: Found: C, 74.36; H, 7.16. $C_{54}H_{62}O_{10}$ requires C, 74.46; H, 7.17%. $^1$H NMR: $\delta_H$ (CDCl$_3$; 300 MHz): 0.94 (6 H, t, $^3J$=6.7 Hz, CH$_3$), 1.19-1.60 (28 H, m, CH$_2$), 1.85 (4 H, m, O—CH$_2$—CH$_2$), 4.06 (4 H, t, $^3J$=6.4 Hz, O—CH$_2$), 7.00 (4 H, d, $^3J$=8.7 Hz, Ar—H), 7.22 (3 H, m, Ar—H), 7.39 (4 H, d, $^3J$=8.6 Hz, Ar—H), 7.50 (1 H, t, $^3J$=8.1 Hz, Ar—H), 8.17 (4 H, d, $^3J$=8.7 Hz, Ar—H), 8.28 (4 H, d, $^3J$=8.6 Hz, Ar—H). $^{13}$C NMR: $\delta_C$ (CDCl$_3$; 75 MHz): 14.6, 23.1, 26.4, 29.5, 29.8, 30.0, 32.3, 68.8, 114.8, 116.2, 119.7, 121.4, 122.5, 127.0, 130.2, 132.2, 132.8, 151.9, 155.9, 164.2, 164.4, 164.6. m/z (MALDI) 893.63 [M+Na]$^+$, $C_{54}H_{62}NaO_{10}$ requires 893.42.

1,3-Phenylene bis(4-(4-(dodecyloxy)benzoyloxy)benzoate) (BC2). Synthesized as described for the preparation of compound BC1. Quantities: resorcinol (0.12 g, 1.1 mmol), 15 (0.97 g, 2.3 mmol), DMAP (0.02 g, 0.1 mmol), DCC (0.91 g, 4.4 mmol). Yield 0.53 g (53%). EA: Found: C, 74.98; H, 7.50. $C_{58}H_{70}O_{10}$ requires C, 75.13; H, 7.61%. $^1$HNMR: $\delta_H$ (CDCl$_3$; 300 MHz): 0.89 (6 H, t, $^3J$=6.9 Hz, CH$_3$), 1.24-1.48 (36 H, m, CH$_2$), 1.84 (4 H, m, O—CH$_2$—CH$_2$—), 4.06 (4 H, t, $^3J$=6.5 Hz, O—CH$_2$), 6.99 (4 H, d, $^3J$=9.0 Hz, Ar—H), 7.19 (3 H, m, Ar—H), 7.38 (4 H, d, $^3J$=8.8 Hz, Ar—H), 7.50 (1 H, t, $^3J$=8.3 Hz, Ar—H), 8.16 (4 H, d, $^3J$=8.9 Hz, Ar—H), 8.28 (4 H, d, $^3J$=8.8 Hz, Ar—H). $^{13}$C NMR: $\delta_C$ (CDCl$_3$; 75 MHz): 14.1, 22.7, 26.0, 29.1, 29.3, 29.5, 29.6, 29.7, 31.9, 68.4, 114.4, 115.8, 119.3, 120.9, 122.1, 126.6, 129.9, 131.9, 132.4, 151.4, 155.5, 163.8, 164.1, 164.3. m/z (MALDI) 950.06 [M+Na]$^+$, $C_{58}H_{70}NaO_{10}$ requires 949.49.

1,3-Phenylene bis(4-(4-(undec-10-enyloxy)benzoyloxy) benzoate) (BC3). Synthesized as described for the preparation of compound BC1. Quantities: resorcinol (0.13 g, 1.1 mmol), 17 (0.92 g, 2.2 mmol), DMAP (0.03 g, 0.2 mmol), DCC (0.92 g, 4.5 mmol). Yield 0.72 g (71%). EA: Found: C, 74.88; H, 7.22.$C_{56}H_{62}O_{10}$ requires C, 75.14; H, 6.98%. $^1$H NMR: $\delta_H$(CDCl$_3$; 300 MHz): 1.24-1.43 (24 H, m, CH$_2$), 1.84 (4 H, m, O—CH$_2$—CH$_2$—), 2.04 (4 H, m, CH$_2$—CH=CH$_2$), 4.06 (4 H, t, $^3J$=6.5 Hz, O—CH$_2$), 4.95 (4 H, m, CH=CH$_2$), 5.80 (2 H, m, CH=CH$_2$), 6.99 (4 H, d, $^3J$=8.9 Hz, Ar—H), 7.19 (3 H, m, Ar—H), 7.38 (4 H, d, $^3J$=8.7 Hz, Ar—H), 7.50 (1 H, t, $^3J$=8.3 Hz, Ar—H), 8.16 (4 H, d, $^3J$=8.9 Hz, Ar—H), 8.28 (4 H, d, $^3J$=8.7 Hz, Ar—H). $^{13}$C NMR: $\delta_C$ (CDCl$_3$; 75 MHz): 26.4, 29.3, 29.4, 29.5, 29.7, 29.8, 29.9, 34.2, 68.8, 114.5, 114.8, 116.2, 119.7, 121.4, 122.5, 127.0, 130.3, 132.3, 132.8, 139.6, 151.8, 155.9, 164.2, 164.5, 164.7. m/z (MALDI) 918.25 [M+Na]$^+$, $C_{56}H_{62}NaO_{10}$ requires 917.42.

1,3-Phenylene bis(4-(4-(11-(acetylthio)undecyloxy)benzoyloxy)benzoate) (BC4). Compound BC3 (0.81 g, 0.9 mmol), thioacetic acid (0.5 mL, 7.2 mmol), and AIBN (0.1 g, 0.6 mmol) were dissolved in THF (50 mL), and the solution was irradiated with UV light while stirring for 3 hours. The solvent was removed, and the residue purified by column chromatography ($CH_2Cl_2$:EtOH, 10:0.03). The product was selectively precipitated from $CH_2Cl_2$ through dropwise addition of petroleum ether. Yield 0.9 g (93%). EA: Found: C, 68.37; H, 7.00. $C_{60}H_{70}NaO_{12}S_2$ requires C, 68.81; H, 6.74%. $^1$H NMR: $\delta_H$ (CDCl$_3$; 300 MHz): 1.27-1.65 (32 H, m, CH$_2$), 1.85 (4 H, m, O—CH$_2$—CH$_2$), 2.35 (6 H, s, COCH$_3$), 2.89 (2 H, t, $^3J$=7.3, SCH$_2$), 4.06 (4 H, t, $^3J$=6.5 Hz, OCH$_2$), 6.99 (4 H, d, $^3J$=9.0 Hz, Ar—H), 7.22 (3 H, m, Ar—H), 7.40 (4 H, d, $^3J$=8.8 Hz, Ar—H), 7.50 (1 H, t, $^3J$=8.3 Hz, Ar—H), 8.17 (4 H, d, $^3J$=8.9 Hz, Ar—H), 8.29 (4 H, d, $^3J$=8.8 Hz, Ar—H). $^{13}$C NMR: $\delta_C$ (CDCl$_3$; 75 MHz): 14.1, 22.7, 26.0, 28.8, 29.1, 29.35, 29.4, 29.5, 29.55, 29.6, 29.65, 29.7, 31.9, 68.4, 114.4, 115.8, 119.3, 120.9, 122.1, 126.6, 129.9, 131.8, 132.4, 151.4, 151.4, 155.5, 163.8, 164.1, 164.3, 196.0. m/z (MALDI) 1069.64 [M+Na]$^+$, $C_{60}H_{70}NaO_{12}S_2$ requires 1069.42.

1,3-Phenylene bis(4-(4-(11-mercaptoundecyloxy)benzoyloxy)benzoate) (BC5). Compound BC4 (0.2 g, 0.2 mmol) was dissolved in 50:50 THF/MeOH (20 mL), and following addition of 3 mL conc. HCl to the flask, the mixture was heated to reflux for 6 hours. The mixture was let to cool to room temperature, diluted with water (10 mL), and extracted with $CH_2Cl_2$ (2×200 mL). The solvent was removed, and the residue purified by column chromatography ($CH_2Cl_2$: EtOH, 10:0.03). The product was then selectively precipitated from $CH_2Cl_2$ through dropwise addition of petroleum ether. Yield 0.11 g (60%). EA: Found: C, 69.37; H, 7.21. $C_{56}H_{66}O_{10}S_2$ requires C, 69.83; H, 6.91%. $^1$H NMR: $\delta_H$ (CDCl$_3$; 300 MHz): 1.24-1.56 (30 H, m, CH$_2$ / SH), 1.63 (4 H, m, S—CH$_2$—CH$_2$), 1.85 (4 H, m, O—CH$_2$—CH$_2$), 2.55 (4 H, q, $^3$J=7.4, SCH$_2$), 4.07 (4 H, t, $^3$J=6.5 Hz, OCH$_2$), 7.01 (4 H, d, $^3$J=8.9 Hz, Ar—H), 7.22 (3 H, m, Ar—H), 7.40 (4 H, d, $^3$J=8.7 Hz, Ar—H), 7.50 (1 H, t, $^3$J=8.2 Hz, Ar—H), 8.17 (4 H, d, $^3$J=8.9 Hz, Ar—H), 8.29 (4 H, d, $^3$J=8.7 Hz, Ar—H). $^{13}$C NMR: δ$_C$ (CDCl$_3$; 75 MHz): 25.1, 26.4, 28.8, 29.5, 29.7, 29.9, 29.9, 34.4, 53.8, 68.8, 114.8, 116.2, 119.7, 121.4, 122.5, 127.0, 130.3, 132.3, 132.8, 151.8, 155.9, 164.2, 164.5, 164.7. m/z (MALDI) 985.81 [M+Na]$^+$, C$_{56}$H$_{66}$NaO$_{10}$S$_2$ requires 985.40.

1,3-Phenylene bis(4-(4-(12-bromododecyloxy)benzoyloxy)benzoate) (BC6). Synthesized as described for the preparation of compound BC1. Quantities: resorcinol (0.12 g, 1.1 mmol), 12 (1.0 g, 2.0 mmol), DMAP (0.03 g, 0.2 mmol), DCC (0.95 g, 4.6 mmol). Yield 0.56 g (48%). EA: Found: C, 64.60; H, 6.09. C$_{58}$H$_{68}$Br$_2$O$_{10}$ requires C, 64.21; H, 6.32%. $^1$H NMR: δ$_H$ (CDCl$_3$; 300 MHz): 1.24-1.52 (32 H, m, CH$_2$), 1.84 (8 H, m, O—CH$_2$—CH$_2$/Br—CH$_2$—CH$_2$), 3.40 (4 H, t, $^3$J=6.9 Hz, Br—CH$_2$), 4.06 (4 H, t, $^3$J=6.5 Hz, O—CH$_2$), 6.99 (4 H, d, $^3$J=9.0 Hz, Ar—H), 7.19 (3 H, m, Ar—H), 7.38 (4 H, d,$^3$J=8.8 Hz, Ar—H), 7.50 (1 H, t, $^3$J=8.3 Hz, Ar—H), 8.16 (4 H, d, $^3$J=8.9 Hz, Ar—H), 8.28 (4 H, d, $^3$J=8.8 Hz, Ar—H). $^{13}$C NMR: δ$_C$ (CDCl$_3$; 75 MHz): 26.0, 28.2, 28.8, 29.1, 29.35, 29.4, 29.5, 32.8, 34.1, 68.4, 114.4, 115.8, 119.3, 121.0, 122.2, 126.6, 129.9, 131.9, 132.4, 151.4, 155.5, 163.8, 164.1, 164.3. m/z (MALDI) 1105.67 (100%) and 1107.67 (51%) [M+Na]$^+$, C$_{58}$H$_{68}$Br$_2$NaO$_{10}$ requires 1105.31 (51%) and 1107.31 (100%).

1,3-Phenylene bis(4-(4-(12-(ethoxycarbonothioylthio)dodecyloxy)benzoyloxy) benzoate) (BC7). Synthesized as described for the preparation of compound 8. Quantities: BC6 (0.10 g, 0.09 mmol), potassium o-ethyl xanthogenate (0.04 g, 0.2 mmol). Yield 0.12 g (quant.). EA: Found: C, 65.16; H, 7.83. C$_{64}$H$_{78}$O$_{12}$S$_4$ requires C, 65.84; H, 6.73%. $^1$H NMR: δ$_H$ (CDCl$_3$; 300 MHz): 1.24-1.56 (38 H, m, CH$_2$/O—CH$_2$—CH$_3$), 1.71 (2 H, m, S—CH$_2$—CH$_2$), 1.85 (4 H, m, O—CH$_2$—CH$_2$), 3.11 (4 H, t, $^3$J=7.4 Hz, SCH$_2$), 4.07 (4 H, t, $^3$J=6.5 Hz, O—CH$_2$), 4.67 (4 H, q, $^3$J=7.1 Hz, O—CH$_2$—CH$_3$), 7.01 (2 H, d,$^3$J=8.7 Hz, Ar—H), 7.21 (3 H, m, Ar—H), 7.40 (4 H, d, $^3$J=8.5 Hz, Ar—H), 7.50 (1 H, t, $^3$J=8.1 Hz, Ar—H), 8.17 (4 H, d, $^3$J=8.7 Hz, Ar—H), 8.29 (4 H, d, $^3$J=8.5 Hz, Ar—H). $^{13}$C NMR: δ$_C$ (CDCl$_3$; 75 MHz): 13.8, 26.0, 28.3, 28.9, 29.1, 29.3, 29.4, 29.5, 35.9, 68.4, 69.7, 114.4, 115.8, 119.3, 120.9, 122.1, 126.6, 129.9, 131.9, 132.4, 151.4, 155.5, 163.8, 164.1, 164.3, 171.6. m/z (MALDI) 1189.33 [M+Na]$^+$, C$_{64}$H$_{78}$NaO$_{12}$S$_4$ requires 1189.43.

4-((3-(4-(4-(Dec-9-enyloxy)benzoyloxy)benzoyloxy)phenoxy)carbonyl)phenyl 4-(decyloxy)-benzoate (BC8). Synthesized as described for the preparation of compound BC1. Quantities: 23 (0.58 g, 1.2 mmol), 18 (0.51 g, 1.3 mmol), DMAP (0.19 g, 1.6 mmol), DCC (0.5 g, 2.4 mmol). Yield 0.68 g (58%). EA: Found: C, 74.69; H, 7.10. C$_{54}$H$_{60}$O$_{10}$ requires C, 74.63; H, 6.96%. $^1$H NMR: δ$_H$ (CDCl$_3$; 300 MHz): 0.93 (3 H, t, $^3$J=6.7 Hz, CH$_3$), 1.18-1.61 (24 H, m, CH$_2$), 1.85 (4 H, m, O—CH$_2$—CH$_2$—), 2.09 (4 H, m, CH$_2$—CH=CH$_2$), 4.06 (4 H, t, $^3$J=6.4 Hz, O—CH$_2$), 5.01 (4 H, m, CH=CH$_2$), 5.86 (2 H, m, CH=CH$_2$), 7.01 (4 H, d, $^3$J=8.7 Hz, Ar—H), 7.23 (3 H, m, Ar—H), 7.40 (4 H, d, $^3$J=8.6 Hz, Ar—H), 7.50 (1 H, t, $^3$J=8.1 Hz, Ar—H), 8.18 (4 H, d, $^3$J=8.7 Hz, Ar—H), 8.27 (4 H, d, $^3$J=8.6 Hz, Ar—H). $^{13}$C NMR: δ$_C$ (CDCl$_3$; 75 MHz): 14.2, 22.7, 26.0, 28.9, 29.1, 29.35, 29.4, 29.6, 68.4, 114.3, 114.5, 115.8, 119.3, 121.0, 122.2, 126.6, 129.9, 131.8, 132.4, 139.1, 151.5, 155.5, 163.8, 164.0, 164.2. m/z (MALDI) 891.43 [M+Na]$^+$, C$_{54}$H$_{60}$NaO$_{10}$ requires 891.41.

4-((3-(4-(4-(10-(Acetylthio)decyloxy)benzoyloxy)benzoyloxy)phenoxy)carbonyl) phenyl 4-(decyl-oxy)benzoate (BC9). Synthesized as described for the preparation of compound BC4. Quantities: BC8 (0.55 g, 0.61 mmol), thioacetic acid (0.3 mL, 4.90 mmol), and AIBN (0.1 g, 0.61 mmol). Yield 0.5 g (86%). EA: Found: C, 70.85; H, 6.91. C$_{56}$H$_{64}$O$_{11}$S requires C, 71.16; H, 6.82%. $^1$H NMR: δ$_H$ (CDCl$_3$; 300 MHz): 0.91 (3 H, t, $^3$J=6.9 Hz, CH$_3$), 1.21-1.66 (28 H, m, CH$_2$), 1.85 (4 H, m, O—CH$_2$—CH$_2$), 2.34 (3 H, s, COCH$_3$), 2.89 (2 H, t, $^3$J=7.3, SCH$_2$), 4.07 (4 H, t, $^3$J=6.5 Hz, OCH$_2$), 7.01 (4 H, d, $^3$J=8.9 Hz, Ar—H), 7.21 (3 H, m, Ar—H), 7.40 (4 H, d, $^3$J=8.7 Hz, Ar—H), 7.52 (1 H, t, $^3$J=8.1 Hz, Ar—H), 8.17 (4 H, d, $^3$J=8.8 Hz, Ar—H), 8.30 (4 H, d, $^3$J=8.7 Hz, Ar—H). $^{13}$C NMR: δ$_C$ (CDCl$_3$; 75 MHz): 14.5, 23.1, 26.35, 26.4, 29.2, 29.45, 29.5, 29.7, 29.8, 29.85, 29.9, 30.0, 31.0, 32.3, 68.75, 68.8, 114.8, 116.2, 119.7, 121.3, 122.6, 127.0, 130.3, 132.3, 132.8, 151.8, 155.9, 164.2, 164.5, 164.7, 196.4. m/z (MALDI) 967.39 [M+Na]$^+$, C$_{56}$H$_{64}$NaO$_{11}$S requires 967.41.

4-((3-(4-(4-(Decyloxy)benzoyloxy)benzoyloxy)phenoxy)carbonyl)phenyl 4-(10-mercaptodecyloxy) benzoate (BC10). Synthesized as described for the preparation of compound 27. Quantities: BC9 (0.45 g, 0.48 mmol), 12M HCl (2 mL). Yield 0.26 g (60%). EA: Found: C, 71.44; H, 6.93. C$_{54}$H$_{62}$O$_{10}$S requires C, 71.82; H, 6.92%. $^1$H NMR: δ$_H$ (CDCl$_3$; 300 MHz): 0.91 (3 H, t, $^3$J=6.8 Hz, CH$_3$), 1.17-1.57 (27 H, m, CH$_2$/SH), 1.63 (2 H, m, S—CH$_2$—CH$_2$), 1.85 (4 H, m, O—CH$_2$—CH$_2$), 2.55 (2 H, q, $^3$J=7.2, SCH$_2$), 4.07 (4 H, t, $^3$J=6.5 Hz, OCH$_2$), 7.01 (4 H, d, $^3$J=8.9 Hz, Ar—H), 7.21 (3 H, m, Ar—H), 7.40 (4 H, d, $^3$J=8.7 Hz, Ar—H), 7.52 (1 H, t, $^3$J=8.1 Hz, Ar—H), 8.18 (4 H, d, $^3$J=8.8 Hz, Ar—H), 8.30 (4 H, d, $^3$J=8.7 Hz, Ar—H). $^{13}$C NMR: δ$_C$ (CDCl$_3$; 75 MHz): 14.5, 23.1, 25.1, 26.4, 28.8, 29.45, 29.5, 29.7, 29.75, 29.8, 29.9, 30.0, 32.3, 34.4, 68.75, 68.8, 114.8, 116.2, 119.7, 121.3, 121.4, 122.6, 127.0, 130.3, 132.3, 132.8, 151.8, 155.9, 163.8, 164.1, 164.3. m/z (MALDI) 941.36 [M+K]$^+$, C$_{54}$H$_{62}$KO$_{10}$S requires 941.37.

4-((3-(4-(4-(12-Bromododecyloxy)benzoyloxy)benzoyloxy)phenoxy)carbonyl)phenyl 4-(dodecyl-oxy)benzoate (BC11). Synthesized as described for the preparation of compound BC1. Quantities: 25 (0.15 g, 0.25 mmol), 17 (0.11 g, 0.25 mmol), DMAP (0.03 g, 0.25 mmol), DCC (0.10 g, 0.5 mmol). Yield 0.18 g (72%). EA: Found: C, 69.39; H, 7.13. C$_{58}$H$_{69}$BrO$_{10}$ requires C, 69.24; H, 6.91%. $^1$H NMR: δ$_H$ (CDCl$_3$; 300 MHz): 0.91 (3 H, t, $^3$J=6.8 Hz, CH$_3$), 1.19-1.56 (34 H, m, CH$_2$), 1.85 (6 H, m, O—CH$_2$—CH$_2$/Br—CH$_2$—CH$_2$), 3.43 (2 H, t, $^3$J=6.8 Hz, CH$_2$Br), 4.08 (4 H, t, $^3$J=6.5 Hz, OCH$_2$), 7.01 (2 H, d, $^3$J=8.8 Hz, Ar—H), 7.21 (3 H, m, Ar—H), 7.40 (4 H, d, $^3$J=8.6 Hz, Ar—H), 7.52 (1 H, t, $^3$J=8.1 Hz, Ar—H), 8.18 (4 H, d, $^3$J=8.8 Hz, Ar—H), 8.30 (4 H, d, $^3$J=8.6 Hz, Ar—H). $^{13}$C NMR: δ$_C$ (CDCl$_3$; 75 MHz): 14.5, 23.1, 26.4, 28.6, 29.2, 29.5, 29.75, 29.8, 29.85, 29.9, 29.95, 30.0, 32.3, 33.2, 34.4, 68.8, 114.7, 114.8, 116.2, 119.7, 121.4, 122.5, 127.0, 130.2, 132.2, 132.25, 132.3, 132.8, 151.8, 151.85, 155.9, 164.2, 164.5, 164.7. m/z (MALDI) 1028.00 (100%) and 1030.03 (97%) [M+Na]$^+$, C$_{58}$H$_{69}$BrNaO$_{10}$ requires 1027.40 (100%) and 1029.40 (97%).

4-((3-(4-(4-(12-Bromododecyloxy)benzoyloxy)benzoyloxy)phenoxy)carbonyl)phenyl 4-(12-(ethoxycarbonothioylthio)dodecyloxy)benzoate (BC12). Synthesized as described for the preparation of compound BC1. Quantities: 25 (0.22 g, 0.37 mmol), 22 (0.20 g, 0.37 mmol), DMAP (0.045 g, 0.37 mmol), DCC (0.15 g, 0.73 mmol). Yield 0.25 g (61%). EA: Found: C, 64.49; H, 6.81. C$_{61}$H$_{73}$BrO$_{11}$S$_2$ requires C, 65.05; H, 6.53%. $^1$H NMR: δ$_H$ (CDCl$_3$; 300 MHz): 1.22-1.62 (35 H, m, CH$_2$/O—CH$_2$—CH$_3$), 1.71 (2 H, m, S—CH$_2$—CH$_2$), 1.87 (6 H, m, O—CH$_2$—CH$_2$/Br—CH$_2$—CH$_2$), 3.13 (2 H, t, $^3$J=7.4 Hz, SCH$_2$), 3.42 (2 H, t, $^3$J=6.8 Hz, CH$_2$Br), 4.07 (4 H, t, $^3$J=6.5 Hz, OCH$_2$), 4.66 (2 H, q, $^3$J=7.1 Hz, O—CH$_2$—CH$_3$), 7.01 (2 H, d, $^3$J=8.7 Hz, Ar—H), 7.21 (3 H, m, Ar—H), 7.40 (4 H, d, $^3$J=8.7 Hz, Ar—H), 7.51 (1 H, t, $^3$J=8.1 Hz, Ar—H), 8.17 (4 H, d, $^3$J=8.7 Hz, Ar—H), 8.30 (4 H, d, $^3$J=8.5 Hz, Ar—H). $^{13}$C NMR: δ$_C$ (CDCl$_3$; 75 MHz): 13.8, 26.0, 28.2, 28.3, 28.8, 28.9, 29.0, 29.3, 29.35, 29.4, 29.5, 31.7, 32.8, 34.0, 35.9, 53.8, 68.4, 69.5, 69.7, 114.4, 115.8, 119.3, 120.9, 122.1, 126.6, 129.9, 131.9, 132.4, 151.4, 155.5, 163.8, 164.1, 164.3, 210.8. m/z (MALDI) 1147.56 (100%) and 1149.59 (97%) [M+Na]$^+$, C$_{61}$H$_{73}$BrNaO$_{11}$S$_2$ requires 1147.37 (100.0%) and 1149.37 (97%).

4-((3-(4-(4-(Dodecyloxy)benzoyloxy)benzoyloxy)phenoxy)carbonyl)phenyl 4-(undec-10-enyloxy) benzoate (BC13). Synthesized as described for the preparation of compound BC1. Quantities: 24 (1.08 g, 2.64 mmol), 18 (1.37 g, 2.64 mmol), DMAP (0.32 g, 2.64 mmol), DCC (0.32 g, 5.28 mmol). Yield 1.5 g (62%). EA: Found: C, 74.91; H, 7.30. $C_{57}H_{66}O_{10}$ requires C, 75.14; H, 7.30%. $^1$H NMR: $\delta_H$ (CDCl$_3$; 300 MHz): 0.89 (3 H, t, $^3$J=6.9 Hz, CH$_3$), 1.24-1.43 (30 H, m, CH$_2$), 1.84 (4 H, m, O—CH$_2$—O—CH$_2$—), 2.04 (2 H, m, CH$_2$—CH=CH$_2$), 4.06 (4 H, t, $^3$J=6.5 Hz, OCH$_2$), 4.95 (2 H, m, CH=CH$_2$), 5.80 (1 H, m, CH=CH$_2$), 6.99 (4 H, d, $^3$J=8.9 Hz, Ar—H), 7.19 (3 H, m, 3H, Ar—H), 7.38 (4 H, d, $^3$J=8.7 Hz, Ar—H), 7.50 (1 H, t, $^3$J=8.1 Hz, Ar—H), 8.16 (4 H, d, $^3$J=8.9 Hz, Ar—H), 8.28 (4 H, d, $^3$J=8.7 Hz, Ar—H). $^{13}$C NMR: $\delta_C$ (CDCl$_3$; 75 MHz): 14.2, 22.7, 26.0, 28.9, 29.1, 29.4, 29.45, 29.5, 29.6, 29.65, 29.7, 31.9, 33.8, 68.4, 114.2, 114.4, 115.8, 119.3, 121.0, 122.1, 126.6, 129.7, 131.8, 132.4, 139.1, 151.5, 155.5, 163.8, 164.0, 164.2. m/z (MALDI) 934.16 [M+Na]$^+$, $C_{57}H_{66}NaO_{10}$ requires 933.46.

4-((3-(4-(4-(11-(Acetylthio)undecyloxy)benzoyloxy)benzoyloxy)phenoxy)carbonyl) phenyl 4-(dodecyloxy)benzoate (BC14). Synthesized as described for the preparation of compound BC4. Quantities: BC13 (0.30 g, 0.3 mmol), thioacetic acid (0.2 mL, 2.6 mmol), AIBN (0.05 g, 0.3 mmol). Yield 0.25 g (84%). EA: Found: C, 71.44; H, 6.93. $C_{59}H_{70}O_{11}S$ requires C, 71.78; H, 7.15%. $^1$H NMR: $\delta_H$ (CDCl$_3$; 300 MHz): 0.91 (3 H, t, $^3$J=6.9 Hz, CH$_3$), 1.21-1.66 (36 H, m, CH$_2$), 1.84 (4 H, m, O—CH$_2$—CH$_2$), 2.33 (3 H, s, COCH$_3$), 2.89 (2 H, t, $^3$J=7.3, SCH$_2$), 4.06 (4 H, t, $^3$J=6.5 Hz, OCH$_2$), 6.99 (4 H, d, $^3$J=8.9 Hz, Ar—H), 7.22 (3 H, m, Ar—H), 7.40 (4 H, d, $^3$J=8.7 Hz, Ar—H), 7.50 (1 H, t, $^3$J=8.1 Hz, Ar—H), 8.17 (4 H, d, $^3$J=8.8 Hz, Ar—H), 8.29 (4 H, d, $^3$J=8.7 Hz, Ar—H). $^{13}$C NMR: $\delta_C$ (CDCl$_3$; 75 MHz): 14.5, 14.55, 22.7, 23.1, 26.4, 29.2, 29.5, 29.6, 29.7, 29.75, 29.8, 29.9, 30.0, 30.1, 31.0, 32.3, 68.8, 114.8, 116.2, 119.7, 121.3, 122.5, 127.0, 130.3, 132.2, 132.8, 151.8, 155.9, 164.2, 164.5, 164.7, 196.4. m/z (MALDI) 1009.98 [M+Na]$^+$, $C_{59}H_{70}NaO_{11}S$ 1009.45.

4-((3-(4-(4-(Dodecyloxy)benzoyloxy)benzoyloxy)phenoxy)carbonyl)phenyl 4-(11-mercaptoun-decyloxy)benzoate (BC15). Synthesized as described for the preparation of compound BC5. Quantities: BC14 (0.16 g, 0.2 mmol), 12 M HCl (2 mL). Yield 0.10 g (67%). EA: Found: C, 72.25; H, 7.50. $C_{57}H_{68}O_{10}S$ requires C, 72.43; H, 7.25%. $^1$H NMR: $\delta_H$ (CDCl$_3$; 300 MHz): 0.91 (3 H, t, $^3$J=6.9 Hz, CH$_3$), 1.19-1.70 (37 H, m, CH$_2$/SH), 1.85 (4 H, m, O—CH$_2$—CH$_2$), 2.55 (2 H, q, $^3$J=7.3 Hz, SCH$_2$), 4.06 (4 H, t, $^3$J=6.5 Hz, OCH$_2$), 7.01 (4 H, d, $^3$J=8.7 Hz, Ar—H), 7.22 (3 H, m, Ar—H), 7.40 (4 H, d, $^3$J=8.6 Hz, Ar—H), 7.50 (1 H, t, $^3$J=8.0 Hz, Ar—H), 8.17 (4 H, d, $^3$J=8.7 Hz, Ar—H), 8.29 (4 H, d, $^3$J=8.5 Hz, Ar—H). $^{13}$C NMR: $\delta_C$ (CDCl$_3$; 75 MHz): 14.6, 23.1, 25.1, 26.4, 28.8, 29.5, 29.7, 29.9, 29.95, 30.0, 30.05, 30.1, 32.3, 34.4, 68.8, 114.8, 116.2, 119.7, 121.3, 122.2, 122.5, 127.0, 130.3, 132.3, 132.75, 132.8, 151.8, 155.9, 164.2, 164.5, 164.7. m/z (MALDI) 967.93 [M+Na]$^+$, $C_{57}H_{68}NaO_{10}S$ requires 967.44.

4-((3-(4-(4-(Dodecyloxy)benzoyloxy)benzoyloxy)phenoxy)carbonyl)phenyl 4-(10-(ethoxycarbono-thioylthio)decyloxy)benzoate (BC16). Synthesized as described for the preparation of compound BC1. Quantities: 20 (0.21 g, 0.4 mmol), 24 (0.18 g, 0.4 mmol), DMAP (0.01 g, 0.09 mmol), DCC (1.12 g, 5.4 mmol). Yield 0.15 g (37%). EA: Found: C, 69.52; H, 7.05. $C_{61}H_{74}O_{11}S_2$ requires C, 69.52; H, 6.92%. $^1$H NMR: $\delta_H$ (CDCl$_3$; 300 MHz): 0.91 (3 H, t, $^3$J=6.9 Hz, CH$_3$), 1.24-1.57 (33 H, m, CH$_2$/O—CH$_2$—CH$_3$), 1.67 (2 H, m, S—CH$_2$—CH$_2$), 1.85 (4 H, m, O—CH$_2$—CH$_2$), 2.88 (2 H, t, $^3$J=7.4 Hz, SCH$_2$), 4.08 (4 H, t, $^3$J=6.5 Hz, OCH$_2$), 4.29 (2 H, q, $^3$J=7.1 Hz, O—CH$_2$—CH$_3$), 7.01 (2 H, d, $^3$J=8.9, Ar—H), 7.21 (3 H, m, Ar—H), 7.40 (4 H, d, $^3$J=8.7, Ar—H), 7.51 (1 H, t, $^3$J=8.4, Ar—H), 8.17 (4 H, d, $^3$J=8.8, Ar—H), 8.30 (4 H, d, $^3$J=8.7, Ar—H). $^{13}$C NMR: $\delta_C$ (CDCl$_3$; 75 MHz): 14.1, 22.7, 26.0, 27.0, 29.1, 29.3, 29.35, 29.4, 29.55, 29.6, 29.65, 29.8, 30.9, 31.9, 34.0, 63.3, 65.1, 68.4, 68.3, 114.4, 115.8, 119.3, 120.9, 122.1, 126.6, 129.9, 131.8, 132.4, 151.4, 155.5, 163.8, 164.1, 164.3, 171.2. m/z (MALDI) 1025.26 [M+Li]$^+$, $C_{59}H_{70}LiO_{11}S_2$ requires 1025.45.

CONCLUSION

We have presented the synthesis and characterization of a new series of bent-core molecules functionalized with thioacetate, xanthate or thiol groups on either only one or both ends. The mono(thiol) functionalized bent-core derivatives BC10 and BC15 have been successfully attached to gold nanoparticles, which display self-assembly behaviour out of solution. These particles, if suspended in a SmCPA host give rise to a number of unique electro-optic effects which will be the subject of further studies. The attachment of sulphur-based functional groups to the bent-core LCs could also be used to produce self-assembled monolayers (SAMs) of functional molecules on gold surfaces.

The invention which has been made, in its product and process aspects is defined by the following claims.

We claim:

1. Symetrically substituted bent-core liquid crystal compounds according to formula I

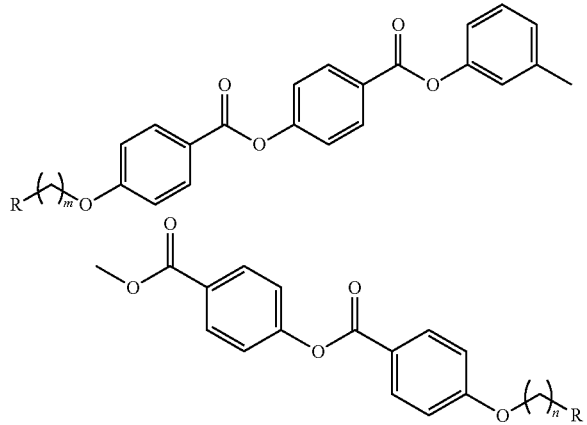

I wherein m=n=11 and R is —SCOCH$_3$ or —SH; or
m=n=12 and R is —Br or —SCSOEt.

2. Asymmetrically substituted derivative of bent-core liquid crystal compounds according to Formula II

II

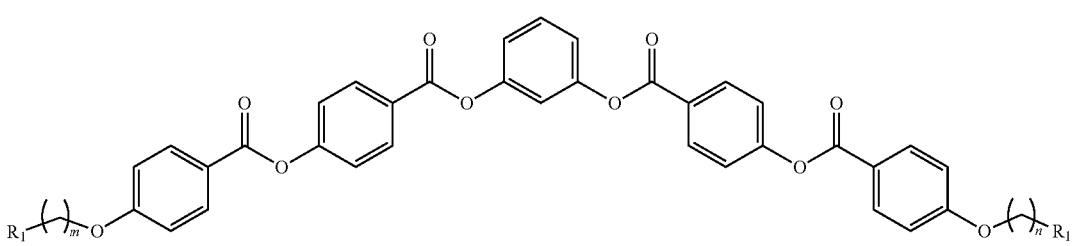

wherein m=9, n=10, R₁ is CH₃ and R₂ is SCOCH₃;
m=9, n=10, R₁ is CH₃ and R₂ is SH;
m=12, n=11, R₁=Br and R₂=CH₃;
m=n=12, R₁ is Br and R₂ is SCSOEt;
m=n=11, R₁ is CH₃ and R₂ is SCOCH₃;
m=n=11; R₁ is CH₃ and R₂ is SH; or
m=11; n=10, R₁ is CH₃ and R₂ is SCSOEt.

3. A method for preparing bent-core liquid crystal decorated nanoclusters, comprising the steps of agitating a solution of hexanethiol-capped gold nanoparticles and an asymmetrically substituted derivative according to Formula II of claim 2 wherein, m=9, n =10, R₁ is CH₃ and R₂ is SH, or wherein m=n=11; R₁ is CH₃ and R₂ is SH in an anhydrous volatile solvent, then slowly evaporating the solvent under nitrogen and drying the mixture.

4. A method for preparing bent-core liquid crystal decorated nanoclusters comprising the steps of:
capping gold nanoparticles with a derivative of said first bent-core liquid crystal compound;
suspending the capped gold nanoparticles in a liquid hydrocarbon;
dispersing the capped gold nanoparticles in a derivative of a second bent-core liquid crystal compound as a host medium to promote the self-assembly of bent-core liquid crystal decorated gold nanoclusters into arrays.

5. A method according to claim 4, wherein said derivative of a first bent-core liquid crystal compound has the Formula I:

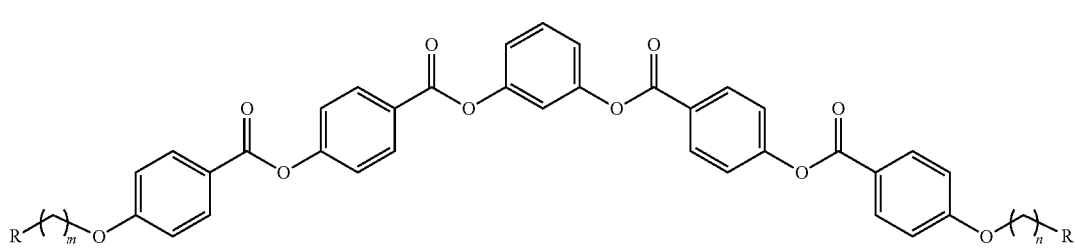

wherein m=n=11 and R is —SCOCH₃ or —SH; or
m=n=12 and R is —Br or —SCSOEt.

6. A method according to claim 5, wherein said derivative of a second bent-core liquid crystal compound according to Formula Ia

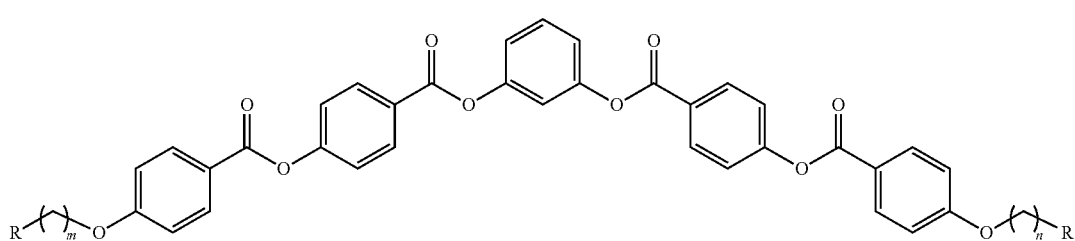

wherein m=n=9 and R is —CH₃; or according to Formula IIa

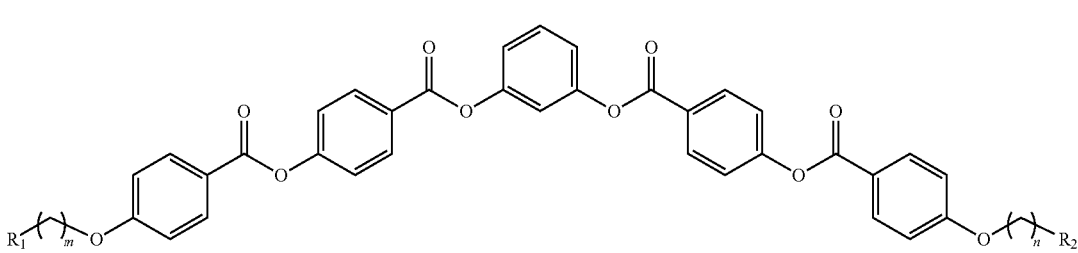

wherein m=9, n=8, R₁ is CH₃ and R₂ is CH=CH₂.

7. A method for enhancing spontaneous polarization in an SmCPA by dispersing in said SmCPA a selected quantity of bent-core decorated gold nanoclusters prepared by the method of claim 3 or claim 6.

* * * * *